US011926162B2

(12) United States Patent
Mizutani et al.

(10) Patent No.: US 11,926,162 B2
(45) Date of Patent: Mar. 12, 2024

(54) INK REFILL CONTAINER AND INK REFILL SYSTEM

(71) Applicant: SEIKO EPSON CORPORATION, Tokyo (JP)

(72) Inventors: Tadahiro Mizutani, Shiojiri (JP); Taku Ishizawa, Matsumoto (JP); Noriyuki Fukasawa, Shiojiri (JP); Naomi Kimura, Okaya (JP); Shoma Kudo, Shiojiri (JP); Manabu Akahane, Tatsuno-machi (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/136,628

(22) Filed: Apr. 19, 2023

(65) Prior Publication Data

US 2023/0311524 A1 Oct. 5, 2023

Related U.S. Application Data

(63) Continuation of application No. 17/946,606, filed on Sep. 16, 2022, now Pat. No. 11,667,123, which is a (Continued)

(30) Foreign Application Priority Data

Jun. 10, 2016 (JP) ................................ 2016-116155
Oct. 17, 2016 (JP) ................................ 2016-203332
(Continued)

(51) Int. Cl.
*B41J 2/175* (2006.01)
*B41J 29/13* (2006.01)

(52) U.S. Cl.
CPC ....... *B41J 2/17506* (2013.01); *B41J 2/17509* (2013.01); *B41J 2/17523* (2013.01);
(Continued)

(58) Field of Classification Search
CPC .... B41J 2/17509; B41J 2/17596; B41J 29/13; B41J 2/17506; B41J 2/17553;
(Continued)

(56) References Cited

U.S. PATENT DOCUMENTS 313,253 A 3/1885 Thatcher
811,811 A 2/1906 Allison
(Continued)

FOREIGN PATENT DOCUMENTS

CN 1269749 A 10/2000
CN 1313233 A 9/2001
(Continued)

OTHER PUBLICATIONS

Jan. 25, 2021 Notice of Allowance Issued in U.S. Appl. No. 16/885,044.

(Continued)

*Primary Examiner* — An H Do
(74) *Attorney, Agent, or Firm* — Oliff PLC

(57) ABSTRACT

An ink refill container configured to refill an ink tank with ink and an ink refill system. An ink refill container includes a container main body having an ink chamber; an ink outlet forming portion provided at an edge of the container main body including an ink outlet configured to allow ink to flow out from the ink chamber; a valve provided in ink outlet forming portion and configured to seal the ink outlet in an openable and closable manner; and a positioning structure configured to abut on part of the ink tank and position the valve relative to ink tank when valve is opened. The positioning structure has a positioning surface located on an opposite side to a container main body side where the container main body is located, across the valve and extends in a direction intersecting with a center axis of the ink outlet.

5 Claims, 39 Drawing Sheets

Related U.S. Application Data continuation of application No. 17/238,923, filed on Apr. 23, 2021, now Pat. No. 11,541,662, which is a continuation of application No. 16/885,044, filed on May 27, 2020, now Pat. No. 11,007,787, which is a continuation of application No. 16/307,389, filed as application No. PCT/JP2017/021276 on Jun. 8, 2017, now Pat. No. 10,752,003.

(30) Foreign Application Priority Data

Oct. 25, 2016 (JP) ................................ 2016-208864
Feb. 28, 2017 (JP) ................................ 2017-036333

(52) U.S. Cl.
CPC ....... *B41J 2/17553* (2013.01); *B41J 2/17596* (2013.01); *B41J 29/13* (2013.01)

(58) Field of Classification Search
CPC ...... B41J 2/1754; B41J 2/17523; B41J 29/02; B41J 2002/17573
See application file for complete search history.

(56) References Cited

U.S. PATENT DOCUMENTS

| | | | |
|---|---|---|---|
| D236,694 | S | 9/1975 | Avolio |
| D240,201 | S | 6/1976 | Avoilio et al. |
| 4,524,365 | A | 6/1985 | Kakeno et al. |
| D398,634 | S | 9/1998 | Katayama et al. |
| 5,874,976 | A | 2/1999 | Katon et al. |
| 5,920,333 | A | 7/1999 | Bates |
| D424,442 | S | 5/2000 | Kreiseder |
| 6,076,920 | A | 6/2000 | Zapata et al. |
| 6,079,823 | A | 6/2000 | Droege |
| 6,164,768 | A | 12/2000 | Murphy et al. |
| D469,119 | S | 1/2003 | Shiba |
| 6,520,630 | B1 | 2/2003 | Oda et al. |
| 6,770,672 | B1 | 8/2004 | Sanders et al. |
| D513,180 | S | 12/2005 | Lindsey et al. |
| 7,014,055 | B2 | 3/2006 | Kano et al. |
| D524,366 | S | 7/2006 | Arai et al. |
| D529,542 | S | 10/2006 | Tazawa |
| D538,850 | S | 3/2007 | Choi et al. |
| 7,300,138 | B2 | 11/2007 | Corner et al. |
| 7,360,876 | B2 | 4/2008 | Inoue et al. |
| D583,862 | S | 12/2008 | Park et al. |
| 7,458,665 | B2 | 12/2008 | Batista et al. |
| 7,607,770 | B2 | 10/2009 | Inoue et al. |
| 7,887,166 | B2 | 2/2011 | Guhse et al. |
| 7,980,686 | B2 | 7/2011 | Guhse et al. |
| 8,020,719 | B2 | 9/2011 | Maiwald et al. |
| 8,397,957 | B2 | 3/2013 | Bloom et al. |
| 9,090,075 | B2 | 7/2015 | Matsumoto et al. |
| 9,186,902 | B2 | 11/2015 | Ishizawa et al. |
| 9,199,769 | B2 | 12/2015 | Wood et al. |
| 9,592,675 | B2 | 3/2017 | Matsumoto et al. |
| 9,662,893 | B2 | 5/2017 | Mori et al. |
| 9,718,276 | B2 | 8/2017 | Tomoguchi |
| 9,994,037 | B2 | 6/2018 | Sakai |
| 10,105,960 | B2 | 10/2018 | Tomoguchi |
| 10,286,676 | B2 | 5/2019 | Kimura et al. |
| 10,350,896 | B2 | 7/2019 | Ishizawa et al. |
| 10,350,901 | B2 | 7/2019 | Mizutani et al. |
| 10,369,800 | B2 | 8/2019 | Rooney et al. |
| 10,427,412 | B2 | 10/2019 | Okude et al. |
| D865,521 | S | 11/2019 | Ishizawa et al. |
| 10,471,723 | B2 | 11/2019 | Fukasawa et al. |
| D899,513 | S | 10/2020 | Ohashi et al. |
| 11,192,380 | B2 | 12/2021 | Ishizawa et al. |
| 11,298,952 | B2 | 4/2022 | Mizutani et al. |
| 2001/0027957 | A1 | 10/2001 | Kano |
| 2002/0066712 | A1 | 6/2002 | Brockwell |
| 2004/0060893 | A1 | 4/2004 | Kano et al. |
| 2004/0061748 | A1 | 4/2004 | Kuwabara et al. |
| 2005/0011916 | A1 | 1/2005 | Battista et al. |
| 2005/0151809 | A1 | 7/2005 | Corner et al. |
| 2005/0270342 | A1 | 12/2005 | Ogura et al. |
| 2006/0017787 | A1 | 1/2006 | Inoue et al. |
| 2006/0108378 | A1 | 5/2006 | Cohen et al. |
| 2007/0024683 | A1 | 2/2007 | Yan |
| 2007/0171263 | A1 | 7/2007 | Inoue et al. |
| 2009/0096836 | A1 | 4/2009 | Haines et al. |
| 2009/0101644 | A1 | 4/2009 | Maiwald et al. |
| 2010/0201761 | A1 | 8/2010 | Lu et al. |
| 2011/0155687 | A1 | 6/2011 | Ammann |
| 2012/0024897 | A1 | 2/2012 | Corbett et al. |
| 2012/0043293 | A1 | 2/2012 | Bryan et al. |
| 2012/0125481 | A1 | 5/2012 | Matsumoto et al. |
| 2012/0152978 | A1 | 6/2012 | Sekiyama et al. |
| 2013/0258004 | A1 | 10/2013 | Kyotani |
| 2014/0104349 | A1 | 4/2014 | Kimura et al. |
| 2014/0158660 | A1 | 6/2014 | Wood et al. |
| 2015/0077487 | A1 | 3/2015 | Ishizawa et al. |
| 2015/0124028 | A1 | 5/2015 | Kimura et al. |
| 2015/0283816 | A1 | 10/2015 | Kimura et al. |
| 2016/0016408 | A1 | 1/2016 | Matsumoto et al. |
| 2016/0089893 | A1 | 3/2016 | Osakabe et al. |
| 2016/0121619 | A1 | 5/2016 | Tomoguchi |
| 2016/0200110 | A1 | 7/2016 | Matsushita et al. |
| 2016/0200111 | A1 | 7/2016 | Kimura et al. |
| 2016/0303860 | A1 | 10/2016 | Mori et al. |
| 2016/0303863 | A1 | 10/2016 | Sakai |
| 2016/0332455 | A1 | 11/2016 | Yoshida et al. |
| 2017/0008295 | A1 | 1/2017 | Osakabe et al. |
| 2017/0120606 | A1 | 5/2017 | Koshikawa et al. |
| 2017/0266977 | A1 | 9/2017 | Osakabe et al. |
| 2017/0282570 | A1 | 10/2017 | Yamaguchi |
| 2017/0313089 | A1 | 11/2017 | Matsushita et al. |
| 2017/0326882 | A1 | 11/2017 | Okude et al. |
| 2017/0341402 | A1 | 11/2017 | Nagashima et al. |
| 2017/0355191 | A1 | 12/2017 | Mizutani et al. |
| 2017/0355194 | A1 | 12/2017 | Fukasawa et al. |
| 2017/0355195 | A1 | 12/2017 | Fukasawa et al. |
| 2017/0368833 | A1 | 12/2017 | Tomoguchi |
| 2018/0154645 | A1 | 6/2018 | Rooney et al. |
| 2018/0207939 | A1 | 7/2018 | Ishizawa et al. |
| 2018/0250943 | A1 | 9/2018 | Fukasawa et al. |
| 2018/0290456 | A1 | 10/2018 | Osakabe et al. |
| 2019/0275801 | A1 | 9/2019 | Osakabe et al. |
| 2019/0299624 | A1 | 10/2019 | Mizutani et al. |
| 2020/0207108 | A1 | 7/2020 | Osakabe et al. |
| 2022/0024214 | A1 | 1/2022 | Osakabe et al. |

FOREIGN PATENT DOCUMENTS

| | | | |
|---|---|---|---|
| CN | 101412450 | A | 4/2009 |
| CN | 101444997 | A | 6/2009 |
| CN | 102126351 | A | 7/2011 |
| CN | 101804736 | B | 12/2011 |
| CN | 202138070 | U | 2/2012 |
| CN | 202186122 | U | 4/2012 |
| CN | 202702869 | U | 1/2013 |
| CN | 204382821 | U | 6/2015 |
| CN | 105564038 | A | 5/2016 |
| CN | 207291315 | U | 5/2018 |
| EP | 0 707 970 | A2 | 4/1996 |
| EP | 3 075 540 | A1 | 10/2016 |
| GB | 2 080 775 | A | 2/1982 |
| IN | 300515 | | 3/2018 |
| JP | S58-107348 | A | 6/1983 |
| JP | S5942963 | A | 3/1984 |
| JP | H05-35690 | U | 5/1993 |
| JP | 3021835 | U | 3/1996 |
| JP | H09-020018 | A | 1/1997 |
| JP | H09-294955 | A | 11/1997 |
| JP | H10-216612 | A | 8/1998 |
| JP | H11-123834 | A | 5/1999 |
| JP | 2001-002097 | A | 1/2001 |
| JP | 2001-088317 | A | 4/2001 |
| JP | 2001-146021 | A | 5/2001 |
| JP | 2001-187459 | A | 7/2001 |
| JP | 2003-305865 | A | 10/2003 |

(56) References Cited

FOREIGN PATENT DOCUMENTS

| | | | |
|---|---|---|---|
| JP | 2004-142442 | A | 5/2004 |
| JP | 2004-142447 | A | 5/2004 |
| JP | 2005-028859 | A | 2/2005 |
| JP | 2006-263960 | A | 10/2006 |
| JP | 2006-281793 | A | 10/2006 |
| JP | 2008-162595 | A | 7/2008 |
| JP | 2008-200912 | A | 9/2008 |
| JP | 2009-241608 | A | 10/2009 |
| JP | 2010-076428 | A | 4/2010 |
| JP | 2010-240907 | A | 10/2010 |
| JP | 3168889 | U | 6/2011 |
| JP | 2011-230840 | A | 11/2011 |
| JP | D1429123 | S | 12/2011 |
| JP | 2012-106363 | A | 6/2012 |
| JP | 2012-131068 | A | 7/2012 |
| JP | 2012-176587 | A | 9/2012 |
| JP | D1455311 | S | 11/2012 |
| JP | 2013-176968 | A | 9/2013 |
| JP | 2013-226830 | A | 11/2013 |
| JP | 2014-008640 | A | 1/2014 |
| JP | 2014-079909 | A | 5/2014 |
| JP | 2014-088207 | A | 5/2014 |
| JP | 2014-091257 | A | 5/2014 |
| JP | 2015-058543 | A | 3/2015 |
| JP | 2015-178280 | A | 10/2015 |
| JP | 2016-041595 | A | 3/2016 |
| JP | 2016-68473 | A | 5/2016 |
| JP | 2016-087844 | A | 5/2016 |
| JP | 2016-102824 | A | 6/2016 |
| JP | 2016-190402 | A | 11/2016 |
| JP | 2016-203404 | A | 12/2016 |
| JP | 2016-203991 | A | 12/2016 |
| JP | 2017-039517 | A | 2/2017 |
| JP | 2017-205895 | A | 11/2017 |
| WO | 2004028817 | A1 | 4/2004 |
| WO | 2014/084264 | A1 | 6/2014 |
| WO | 2015/079547 | A1 | 6/2015 |
| WO | 2016/060019 | A1 | 4/2016 |
| WO | 2017/020915 | A1 | 2/2017 |
| WO | 2020/242453 | A1 | 12/2020 |

OTHER PUBLICATIONS

Jul. 15, 2020 Notice of Allowance issued in U.S. Appl. No. 16/857,065.

International Search Report dated Aug. 22, 2017 in PCT/JP2017/021057 with English-language translation (4 pgs.).

Final Office Action dated Oct. 19, 2018 in related U.S. Appl. No. 15/617,682.

Final Office Action dated Sep. 4, 2018 in co-pending U.S. Appl. No. 15/615,525 (11 pgs.).

International Search Report dated Aug. 22, 2017 in PCT/JP2017/021276 with English-language translation (4 pgs.).

Office Action dated May 31, 2018 in co-pending U.S. Appl. No. 15/617,682 (8 pgs.).

Office Action dated May 31, 2018 in co-pending U.S. Appl. No. 15/617,782 (8 pgs.).

Office Action dated Feb. 13, 2018 in co-pending U.S. Appl. No. 15/615,525 (10 pgs.).

Final Office Action on U.S. Appl. No. 15/617,834 dated Mar. 26, 2019.

Jul. 7, 2022 Notice of Allowance issued U.S. Appl. No. 17/238,923.

Ink Pro 2 day. "4-Empty 90ml Ink Bottles with Special filling cap for Epson EcoTank Printers," https://www.inkpro2day.com/4-empty-90mi-ink-bottles-with- special-filling-cap-for-epson-ecotank-printers/?gclid=EAlalQobChM ll6zqt5z, Aug. 26, 2022, 6 pages.

Jan. 30, 2023 Notice of Allowance issued in U.S. Appl. No. 17/946,606.

INK REFILL CONTAINER AND INK REFILL SYSTEM

CROSS-REFERENCE TO RELATED APPLICATIONS

This application is a continuation of U.S. application Ser. No. 17/946,606, filed Sep. 16, 2022, which is a continuation of U.S. application Ser. No. 17/238,923, filed Apr. 23, 2021, which is a continuation of U.S. application Ser. No. 16/885,044, filed May 27, 2020 (now U.S. Pat. No. 11,007,787 issued on May 18, 2021), which is a continuation of U.S. application Ser. No. 16/307,389, filed Dec. 5, 2018 (now U.S. Pat. No. 10,752,003); which is a national phase entry of PCT/JP2017/021276, filed Jun. 8, 2017, which claims priority to Japanese Appl. 2016-116155, filed Jun. 10, 2016; Japanese Appl. 2016-203332, filed Oct. 17, 2016; Japanese Appl. 2016-208864, filed Oct. 25, 2016; and Japanese Appl. 2017-036333, filed Feb. 28, 2017; the contents of all of which are incorporated by reference herein in their entirety.

FIELD

The present disclosure relates to an ink refill container configured to refill ink to an ink tank provided to accumulate therein ink that is to be supplied to a recording device, as well as to an ink refill system configured to include such an ink refill container.

BACKGROUND

An ink tank configured to accumulate ink therein is generally connected with a recording device that performs recording by ejecting ink onto a medium, in such a state that ink is suppliable from the ink tank. In this recording device, when the ink tank has only a small remaining amount of ink, the ink tank is externally refilled with ink by using an ink refill container (as described in, for example, Patent Literature 1).

CITATION LIST

Patent Literature: JP 2001-146021A

SUMMARY

Technical Problem

There is a need to appropriately perform an ink refill operation for the ink tank with suppressing an ink refill failure and the like. The user of the recording device conventionally performs this refill operation. A further improvement is thus required for the ink refill container and the like, in order to enable the user to appropriately perform this ink refill operation.

By taking into account the foregoing circumstances, an object of the present disclosure is to provide an ink refill container configured to appropriately refill an ink tank with ink and an ink refill system including such an ink refill container.

Solution to Problem

The following describes some aspects to solve the above problem and their functions and advantageous effects.

An ink refill container provided to solve the above problem is configured to refill ink into an ink tank that has an ink inlet flow path portion and an ink chamber arranged to communicate with the ink inlet flow path portion. The ink refill container comprises a container main body provided to include an ink chamber configured to contain therein ink, which is to be refilled to the ink tank; an ink outlet forming portion provided at an edge of the container main body to include an ink outlet configured to allow the ink to flow out from the ink chamber; a valve provided in the ink outlet forming portion and configured to seal the ink outlet in an openable and closable manner; and a positioning structure configured to abut on part of the ink tank and position the valve relative to the ink tank when the valve is opened. The positioning structure has a positioning surface that is located on an opposite side to a container main body side where the container main body is located, across the valve and that is extended in a direction intersecting with a center axis of the ink outlet. The positioning surface abuts on the part of the ink tank, when the ink inlet flow path portion of the ink tank is inserted into the ink outlet to open the valve.

According to this aspect, when the ink refill container is moved toward the ink tank and the ink inlet flow path portion of the ink tank is inserted into the ink outlet to open the valve, the positioning surface is moved toward the ink tank, prior to the valve. For example, a configuration provided to guide the move of the positioning surface in a direction of insertion of the ink inlet flow path portion into the ink outlet enables the ink inlet flow path portion to be readily guided relative to the valve. When the positioning surface abuts on part of the ink tank in the process of ink refill to the ink tank, the attitude of the ink refill container is stabilized in the direction intersecting with the center axis of the ink outlet. This facilitates the ink refill and enables the ink tank to be appropriately refilled with ink.

In the ink refill container of the above aspect, the positioning surface may be located on the opposite side to the container main body side across the ink outlet in a direction along the center axis of the ink outlet.

According to this aspect, when the ink inlet flow path portion of the ink tank is inserted into the ink outlet of the ink refill container, the positioning surface approaches the ink tank, prior to the ink outlet. This configuration readily prevents the ink outlet from colliding with other members when the ink refill container approaches the ink tank. This accordingly readily prevents damage of the ink outlet and adhesion of ink to other members.

In the ink refill container of the above aspect, the positioning surface may be formed at a leading end of a tubular portion that forms the ink outlet to be open outward at an edge of the ink outlet forming portion.

According to this aspect, the positioning surface is formed on the tubular portion that, along with the ink outlet, forms the ink outlet forming portion. This simplifies the configuration, compared with formation of the positioning surface by a projection or the like provided at a different position from the ink outlet.

Another ink refill container provided to solve the above problem is configured to refill ink into an ink tank that has an ink inlet flow path portion and an ink chamber arranged to communicate with the ink inlet flow path portion. The ink refill container comprises a container main body provided to include an ink chamber configured to contain therein ink, which is to be refilled to the ink tank; an ink outlet forming portion provided at an edge of the container main body to include an ink outlet configured to allow the ink to flow out from the ink chamber; a valve provided in the ink outlet forming portion and configured to seal the ink outlet in an openable and closable manner; and a positioning structure configured to abut on part of the ink tank and position the valve relative to the ink tank when the valve is opened. The ink outlet is formed in a tubular portion that is part of the ink outlet forming portion. The positioning structure includes a positioning surface that is provided to be opposed to an outer face of the tubular body across a clearance and that is extended in a direction intersecting with a center axis of the ink outlet. The positioning surface abuts on the part of the ink tank, when the ink inlet flow path portion of the ink tank is inserted into the ink outlet to open the valve.

According to this aspect, in the process of ink refill from the ink refill container to the ink tank, the positioning surface extended in the direction intersecting with the center axis of the ink outlet abuts on part of the ink tank. This configuration enables the ink tank in the stable state to be appropriately refilled with ink. This configuration also causes ink adhering to the ink outlet or to the positioning surface to be drawn into the clearance and thereby reduces the possibility of ink dripping and external contamination.

In the ink refill container of the above aspect, an area of the positioning surface abutting on the part of the ink tank on a side farther from the ink outlet in the direction intersecting with the center axis of the ink outlet may be larger than an area of the positioning surface abutting on the part of the ink tank on a side closer to the ink outlet.

This configuration enhances the stability of the attitude of the ink outlet in the ink refill state where the ink inlet flow path portion is inserted into the ink outlet to open the valve.

Another ink refill container provided to solve the above problem is configured to refill ink into an ink tank that has an ink inlet flow path portion and an ink chamber arranged to communicate with the ink inlet flow path portion. The ink refill container comprises a container main body provided to include an ink chamber configured to contain therein ink, which is to be refilled to the ink tank; an ink outlet forming portion provided at an edge of the container main body to include an ink outlet configured to allow the ink to flow out from the ink chamber; a valve provided in the ink outlet forming portion and configured to seal the ink outlet in an openable and closable manner; and a positioning structure configured to abut on part of the ink tank and position the valve relative to the ink tank when the valve is opened. The positioning structure includes a positioning surface that is inclined or curved in a direction intersecting with a center axis of the ink outlet. The positioning surface abuts on the part of the ink tank, when the ink inlet flow path portion of the ink tank is inserted into the ink outlet to open the valve.

This configuration positions the ink refill container in both a direction along the center axis of the ink outlet and a direction orthogonal to the center axis in the process of ink refill from the ink refill container to the ink tank and thereby ensures appropriate ink refill.

In the ink refill container of the above aspect, the positioning surface may be inclined or curved in a direction gradually farther away from the center axis, with respect to a direction from the ink outlet toward the container main body.

This configuration enables the ink refill container to be gradually guided along the inclined or curved positioning surface when the ink inlet flow path portion is inserted into and pulled out from the ink outlet.

In the ink refill container of the above aspect, the positioning structure may be provided in a region exposed outside in at least one of the ink outlet forming portion and the container main body.

This configuration causes the positioning structure to be readily visible from outside when the ink inlet flow path portion of the ink tank is inserted into the ink outlet of the ink refill container. In the case where the positioning structure is provided in the region exposed outside in the container main body, the container main body that contains ink therein is positioned. This means positioning of the heavy portion and thereby stabilizes the attitude of ink refill.

Another ink refill container provided to solve the above problem is configured to refill ink into an ink tank that has an ink inlet flow path portion and an ink chamber arranged to communicate with the ink inlet flow path portion. The ink refill container comprises a container main body provided to include an ink chamber configured to contain therein ink, which is to be refilled to the ink tank; an ink outlet forming portion provided at an edge of the container main body to include an ink outlet configured to allow the ink to flow out from the ink chamber; a valve provided in the ink outlet forming portion and configured to seal the ink outlet in an openable and closable manner; and a positioning structure configured to abut on part of the ink tank and position the valve relative to the ink tank when the valve is opened. The positioning structure is provided inside of the ink outlet.

This configuration protects the positioning structure inside of the ink outlet and is thus unlike to damage the positioning structure, compared with a configuration that the positioning structure is provided outside of the ink outlet. The positioning structure is placed near to the valve inside of the ink outlet. This configuration enables the valve to be positioned relative to the ink tank with high accuracy. Furthermore, even when ink adheres to the positioning structure located inside of the ink outlet, this configuration reduces the possibility that ink adheres to outside of the ink refill container.

An ink refill system provided to solve the above problem comprises an ink tank that provided to include an ink inlet flow path portion and an ink chamber arranged to communicate with the ink inlet flow path portion; the ink refill container of any of the above aspects; and an auxiliary positioning member placed between the positioning structure and the part of the ink tank when the valve of the ink refill container is positioned relative to the ink tank via the positioning structure, and configured to mediate abutting of the positioning structure and the part of the ink tank.

According to this aspect, in the process of ink refill from the ink refill container to the ink tank, the ink refill container is appropriately positioned relative to the various ink tanks by means of the auxiliary positioning member.

In the ink refill system of the above aspect, the auxiliary positioning member may be formed from an ink absorber that is configured to absorb ink.

According to this aspect, the ink absorber relieves the impact when the positioning structure of the ink refill container abuts on part of the ink tank. Absorption of ink by the ink absorber reduces dripping or spatter of ink when the ink refill container is dismounted.

Another ink refill container provided to solve the above problem is configured to refill ink into an ink tank that has an ink inlet flow path portion and an ink chamber arranged to communicate with the ink inlet flow path portion. The ink refill container comprises a container main body provided to include an ink chamber configured to contain therein ink, which is to be refilled to the ink tank; an ink outlet forming portion provided at an edge of the container main body to include an ink outlet configured to allow the ink to flow out from the ink chamber; a valve provided in the ink outlet forming portion and configured to seal the ink outlet in an openable and closable manner; and a positioning structure configured to abut on part of the ink tank and position the valve relative to the ink tank when the valve is opened.

According to this aspect, when the positioning structure of the ink refill container abuts on part of the ink tank in the process of ink refill, the valve configured to open and close the ink outlet is positioned relative to the ink tank. This facilitates the ink refill and enables the ink tank to be appropriately refilled with ink.

BRIEF DESCRIPTION OF DRAWINGS

FIG. 5 is a partially broken sectional view taken along an arrow 5-5 in

FIG. 3;

DESCRIPTION OF EMBODIMENTS

First Embodiment

Figure 1:
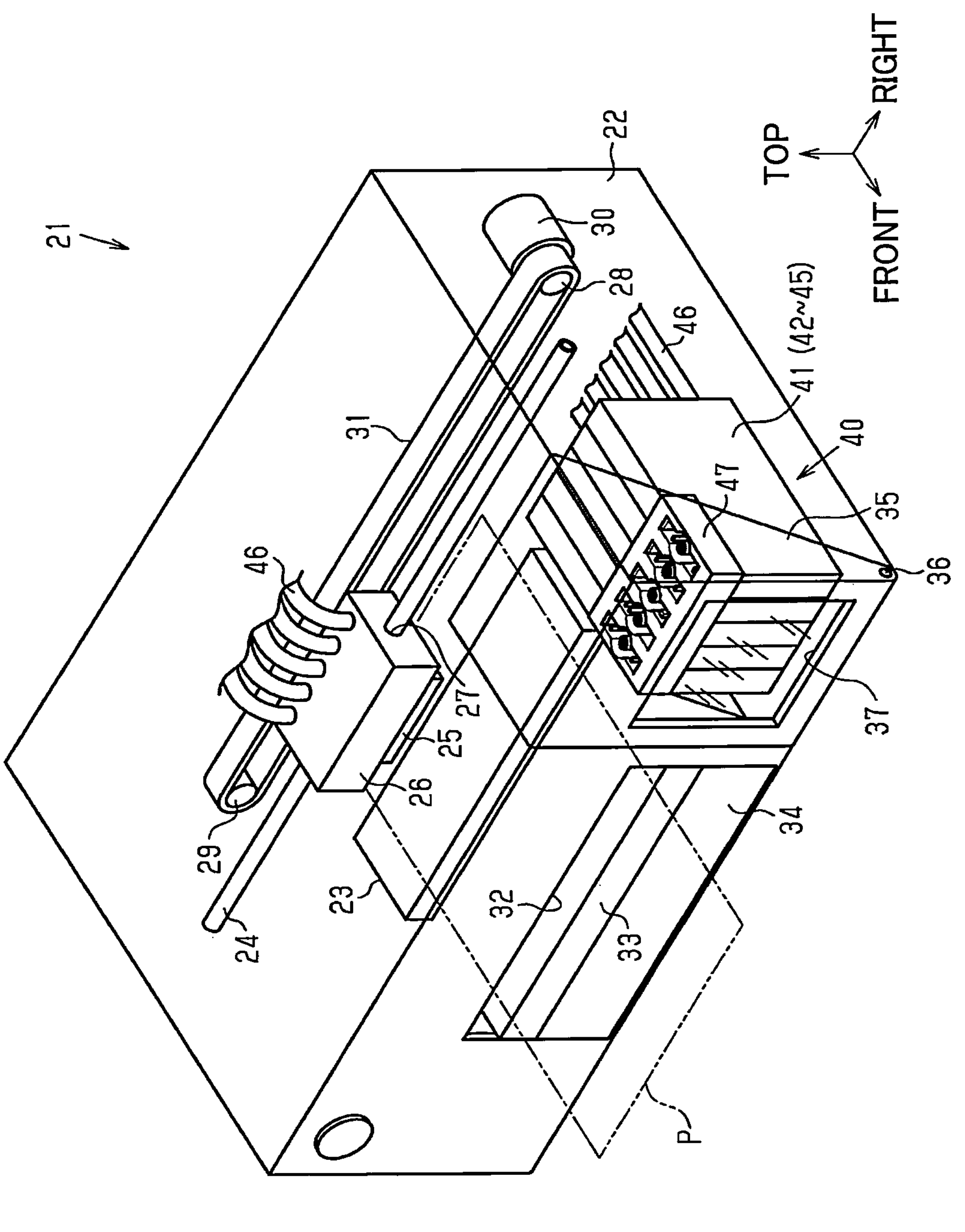
FIG. 1 is a perspective view illustrating the schematic configuration of a recording device in perspective.

The following describes a first embodiment of an ink refill system including ink tanks and ink refill containers in a recording device with reference to drawings. The recording device of this embodiment is an inkjet printer that ejects ink to a medium to perform recording (printing) of an image and the like on the medium. In the drawings, it is assumed that the recording device having a predetermined height in a vertical direction, a predetermined width in a left-right direction and a predetermined depth in a front-rear direction is placed on a horizontal plane. In the respective drawings, the vertical direction that is along a vertical line, the left-right direction that is orthogonal to the vertical line and that is along the horizontal plane, and the front-rear direction that is orthogonal to both the vertical direction and the left-right direction and that is along the horizontal plane are shown by arrows.

As shown in FIG. 1, a recording device 21 includes a housing 22 in a rectangular parallelepiped shape having the left-right direction as its longitudinal direction. FIG. 1 schematically illustrates a perspective of inside of the housing 22 in the recording device 21. A support base 23 having the left-right direction as its longitudinal direction is provided in a lower rear portion of the housing 22, such that its upper face is along substantially the horizontal direction. A sheet of paper Pas one example of the medium is supported on the upper face of this support base 23 and is fed forward that is a feeding direction. A guide shaft 24 extended along the left-right direction is laid at a position above the support base 23 in the housing 22 to support a carriage 26, which is provided with a record head 25 on its lower face to eject ink therefrom. More specifically, the carriage 26 is supported to be reciprocable in the left-right direction relative to the guide shaft 24, which is inserted in a support hole 27 pierced in the left-right direction.

A drive pulley 28 and a driven pulley 29 are respectively supported to be rotatable at positions near to the respective ends of the guide shaft 24 in the housing 22. An output shaft of a carriage motor 30 is coupled with the drive pulley 28, and an endless timing belt 31 partly coupled with the carriage 26 is wound between the drive pulley 28 and the driven pulley 29. When the carriage motor 30 is driven to cause the carriage 26 guided by the guide shaft 24 via the timing belt 31 to reciprocate along the left-right direction that is a scanning direction relative to the paper P, ink is ejected from the record head 25 on the lower face of the carriage 26 toward the paper P fed forward on the support base 23.

As shown in FIG. 1, a rectangular eject slot 32 is open in a front face of the housing 22 at a position on the front side of the support base 23 to eject forward the paper P subjected to recording by ejection of ink from the record head 25 in the course of feeding on the support base 23 in the housing 22. The eject slot 32 is provided with an eject tray 33 formed in a rectangular plate-like shape and configured to be retractable forward that is an ejecting direction and to support the paper P that is to be ejected out from the housing 22. A paper feed cassette 34 is mounted below the eject tray 33 in the eject slot 32 to be insertable and drawable in the front-read direction and to place therein a stack of multiple sheets of paper P used for recording.

As shown in FIG. 1, an open/close door 35 having a rectangular front face and a rectangular upper face and a right triangular right side face is provided in the front face of the housing 22 at a position on an edge side (right edge side in FIG. 1) of the eject slot 32 in the left-right direction and is configured to freely open and close in the front-rear direction around a rotating shaft 36 as the center of rotation, which is provided on its lower end to be along the left-right direction. A window portion 37 is formed from a rectangular transparent material in the front face of this open/close door 35 to allow the user to visually check inside of the housing 22 (especially the back side of the front face of the open/close door 35) in the closed state of the open/closer door 35.

An ink supply unit 40 is placed at a position on the back side of the open/close door 35 or more specifically at a position near to the front face and near to one edge (near to a right edge in this case) in the housing 22 of the recording device 21 and is configured to supply ink to the record head 25. The ink supply unit 40 is a structure that includes a plurality of (five according to this embodiment) ink tanks 41 to 45 and that is integrally handled. The respective ink tanks 41 to 45 may be refilled with inks as described later.

Figure 2:
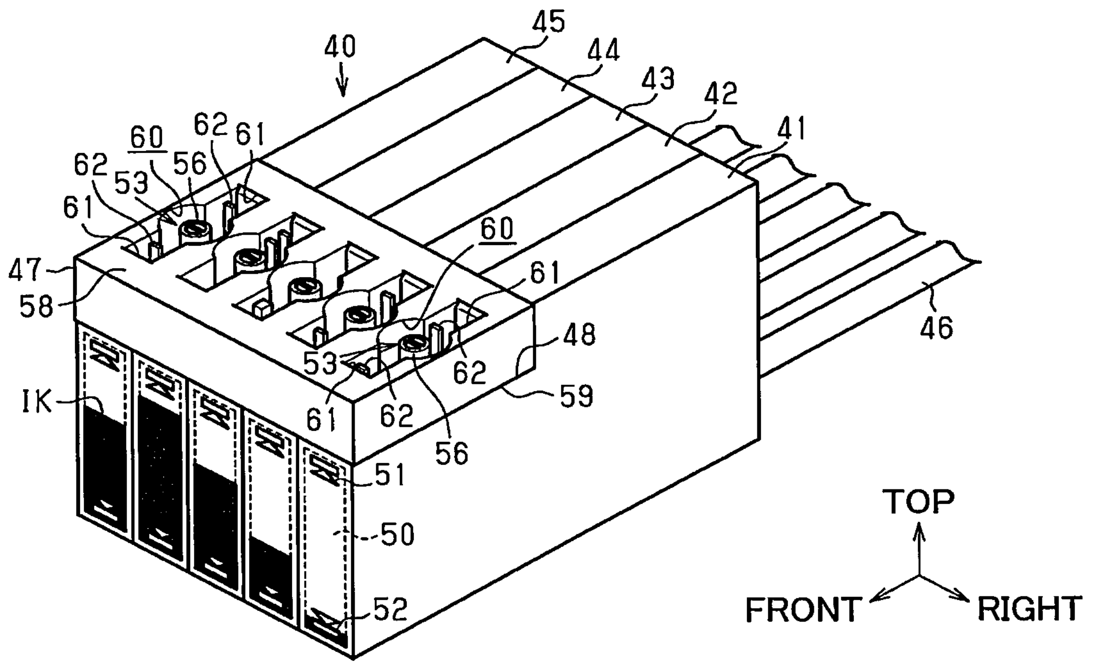
FIG. 2 is a perspective view illustrating an ink supply unit provided in a housing of the recording device.
Figure 3:
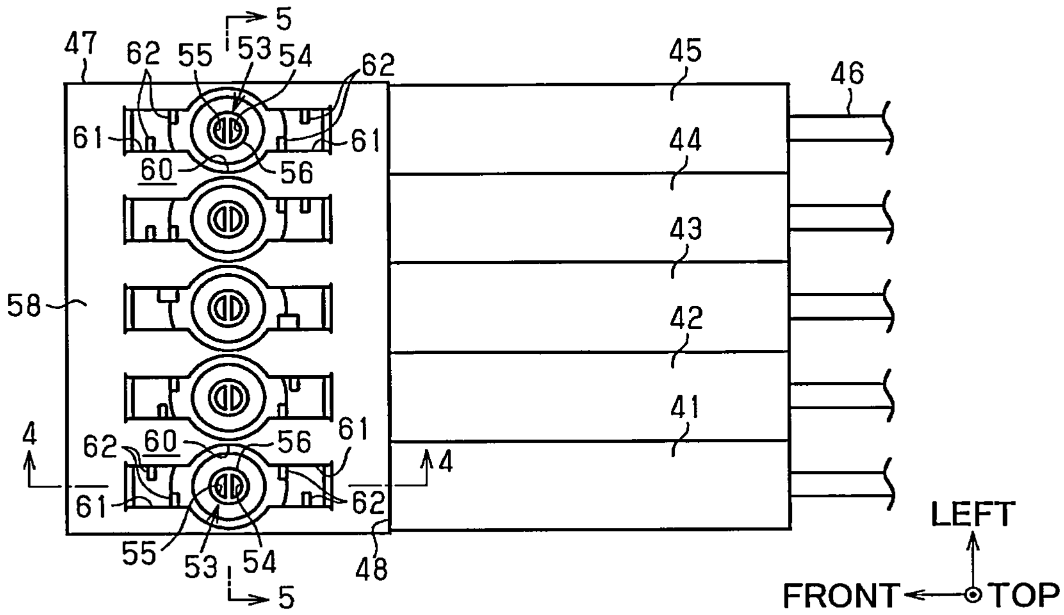
FIG. 3 is a plan view illustrating the ink supply unit.

As shown in FIG. 2 and FIG. 3, the ink supply unit 40 is configured to include five ink tanks 41 to 45 formed in a box-like shape elongated in the front-rear direction, five ink supply tubes 46 drawn out from a rear face side of the respective ink tanks 41 to 45, and an ink refill adapter 47 formed in a rectangular parallelepiped shape and assembled to integrate these ink tanks 41 to 45. This ink refill adapter 47 is laid on a step portion 48 formed by cutting upper front sections of all the ink tanks 41 to 45, which are arranged side by side in the left-right direction as their thickness directions, such as to be integrated with the ink tanks 41 to 45. As shown in FIG. 1, the ink supply tubes 46 drawn out from the ink tanks 41 to 45 are connected with ink flow paths (not shown) formed in the carriage 26 and are further connected with the record head 25 via the ink flow paths. The ink refill adapter 47 may be configured to form part of the housing 22 that covers the ink tanks 41 to 45 or may be formed integrally with the ink tanks 41 to 45.

Figure 4:
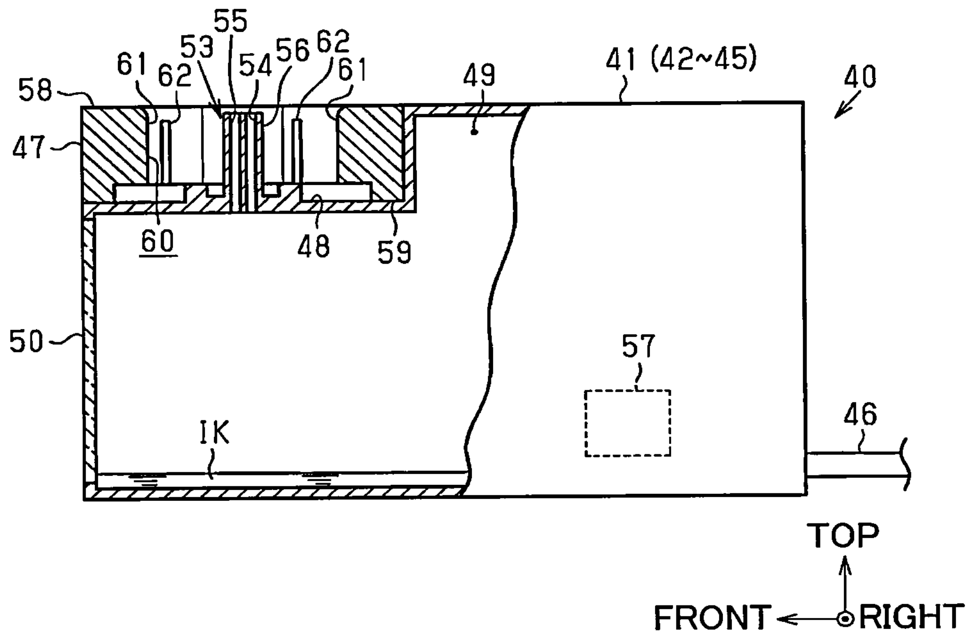
FIG. 4 is a partially broken sectional view taken along an arrow 4-4 in FIG. 3.
Figure 5:
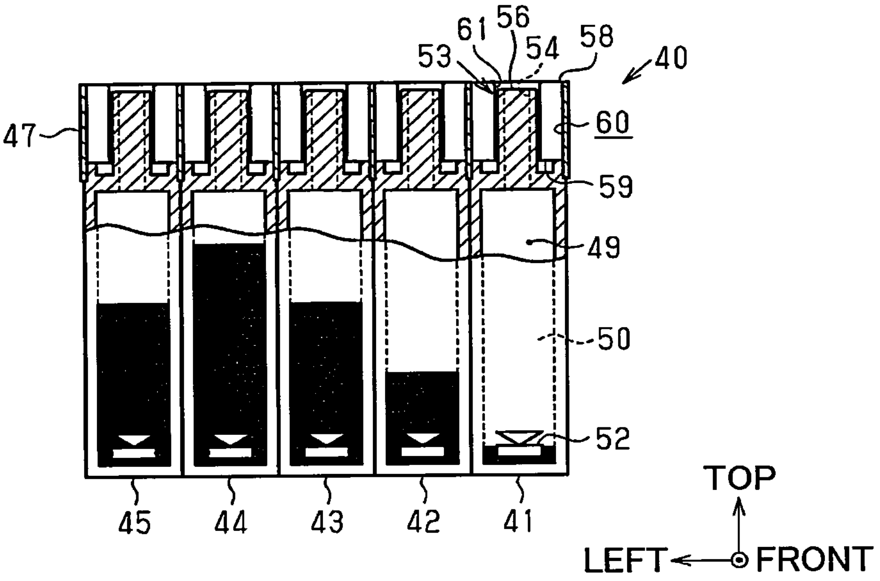

As shown in FIG. 4 and FIG. 5, each of the ink tanks 41 to 45 has an ink chamber 49 to contain ink IK therein. According to this embodiment, black ink is contained in the ink chamber 49 of the ink tank 41 that is located at a right end in the arrayed direction. Color inks other than black (for example, cyan, magenta and yellow) are contained in the ink chambers 49 of the other respective ink tanks 42 to 45 arrayed on the left side of the ink tank 41 at the right end in the arrayed direction. Each of the ink tanks 41 to 45 has a visible portion 50 that is provided in a front wall portion visible through the window portion 37 in the front face of the housing 22 and that is made of a transparent resin to make the liquid surface of the ink IK in the ink chamber 49 visible. An upper limit mark 51 providing a rough indication of the upper limit of the liquid surface of the ink IK contained in the ink chamber 49 (for example, a rough indication of the amount of ink injectable without overflow from an ink inlet 53) and a lower limit mark 52 providing a rough indication of the lower limit (for example, a rough indication encouraging refill of ink) are marked down on the visible portion 50.

As shown in FIG. 4, an ink inlet 53 is provided above a horizontal section of the step portion 48 in each of the ink tanks 41 to 45 to allow ink to flow from outside into the ink chamber 49. The ink inlet 53 is configured to include a needle 56 as one example of an ink inlet flow path portion that is extended upward in the vertical direction and includes flow paths 54 and 55 arranged to make the inside and the outside of the ink chamber 49 communicate with each other. The two flow paths 54 and 55 are formed inside of the needle 56 in a cylindrical shape to be defined by a partition wall that is formed at the center position in the front-rear direction and that is extended in the vertical direction. Accordingly, the flow paths 54 and 55 of the embodiment are formed to have approximately equal sectional areas and approximately equal heights of their leading end openings. A remaining amount sensor 57 is provided in a lower rear portion of the ink chamber 49 and is used to detect the remaining amount of the ink IK in the ink chamber 49. The remaining amount sensor 57 may not be necessarily provided.

As shown in FIGS. 2 to 5, the ink refill adapter 47 has an upper face 58 that is a horizontal face along a direction perpendicular to (intersecting with) the extended direction of the needle 56, and a through hole 60 is formed as an ink inlet forming portion that is pierced in the vertical direction from the upper face 58 to a lower face 59. This through hole 60 includes the ink inlet 53 in a circular hole shape with the needle 56 placed in the center thereof, and a pair of front and rear rectangular holes arranged on the front side and on the rear side of the ink inlet 53. The pair of front and rear rectangular holes have lower openings that are closed by the horizontal section of the step portion 48, from which the needle 56 is protruded upward, in each of the ink tanks 41 to 45.

A pair of front and rear recesses 61 that are open upward as the extended direction of the needle 56 are formed by the pair of front and rear rectangular holes having the closed lower openings in an area outside of the ink inlet 53 in a radial direction around the ink inlet 53 as the center and are recessed vertically downward as their depth directions to be symmetric with respect to the ink inlet 53 as the center. Accordingly, in the ink refill adapter 47 integrated with the ink tanks 41 to 45, a plurality of (in this case, a pair of front and rear) recesses 61 are formed in the area outside of the ink inlet 53 including the needle 56 and are arranged to be symmetric with respect to the ink inlet 53 as the center. In this case, a leading end of the needle 56 placed at the center of the ink inlet 53 in the circular hole shape is located on the ink chamber 49-side of the upper face 58 of the ink refill adapter 47 that is an opening edge of the through hole 60 including the ink inlet 53 and the recesses 61. Accordingly, the upper face 58 of the ink refill adapter 47 is extended in a direction intersecting with the extended direction of the needle 56 at a position outside of the leading end of the needle 56 in the extended direction of the needle 56. The lower face 59 of the ink refill adapter 47, on the other hand, serves as a tank engagement portion to collectively engage downward with the plurality of ink tanks 41 to arranged side by side in the left-right direction.

A peripheral portion of the upper opening edge of each through hole in the upper face 58 of the ink refill adapter 47 is colored in a specific color. More specifically, the peripheral portion is colored in the same color as the color of ink contained in the ink chamber 49 of each of the ink tanks 41 to 45, which the ink flows in through the ink inlet 53 of the through hole From this point of view, the peripheral portion of the upper opening edge of each through hole 60 in the ink refill adapter 47 serves as a first portion that externally indicates information regarding the ink contained in each of the ink tanks 41 to 45 that has the ink chamber 49 communicating with the ink inlet 53 of the through hole 60. For example, the peripheral portion of the upper opening of the through hole 60, which the ink inlet 53 communicating with the ink chamber 49 of the ink tank 41 that contains black ink therein is placed in, is colored in black.

First concavo-convex elements (first key structures) 62 in a characteristic concavo-convex shape in the horizontal direction are provided at positions on the bottom face side of upper opening edges of the recesses 61 in inner face of the recesses 61 (more specifically, horizontal part-side of the step portion) to be extended in the depth direction of the recesses 61 (in other words, the direction of a center axis of the ink inlet 53). As shown in FIG. 2 and FIG. 3, the first concavo-convex elements 62 are provided for each of the ink inlets 53 of the plurality of (according to the embodiment, five) ink tanks 41 to 45. Accordingly, different first concavo-convex elements 62 are formed on the inner face of the rectangular recesses 61 of each through hole to be different from the first concavo-convex elements 62 provided on the inner face of the recesses 61 of the other through hole 60 in the respective through holes 60 formed in the ink refill adapter 47 at positions corresponding to the respective ink tanks 41 to 45 in the vertical direction. The first concavo-convex elements 62 accordingly serve as an identification portion to identify each ink refill container 63 (as shown in, for example, FIG. 6) having an ink outlet 65 (as shown in, for example, FIG. 6), which is to be connected with the ink inlet 53 of the through hole 60 having the first concave-convex elements 62 that are formed therein. The "position on the bottom face side of the upper opening edges of the recesses 61" may be any position even slightly below the opening edges toward the bottom face side.

The following describes the ink refill containers 63 that, in combination with the ink tanks 41 to 45, constitute the ink refill system and are used to refill the respective inks to the ink tanks 41 to 45 having small remaining amounts of inks.

Figure 6:
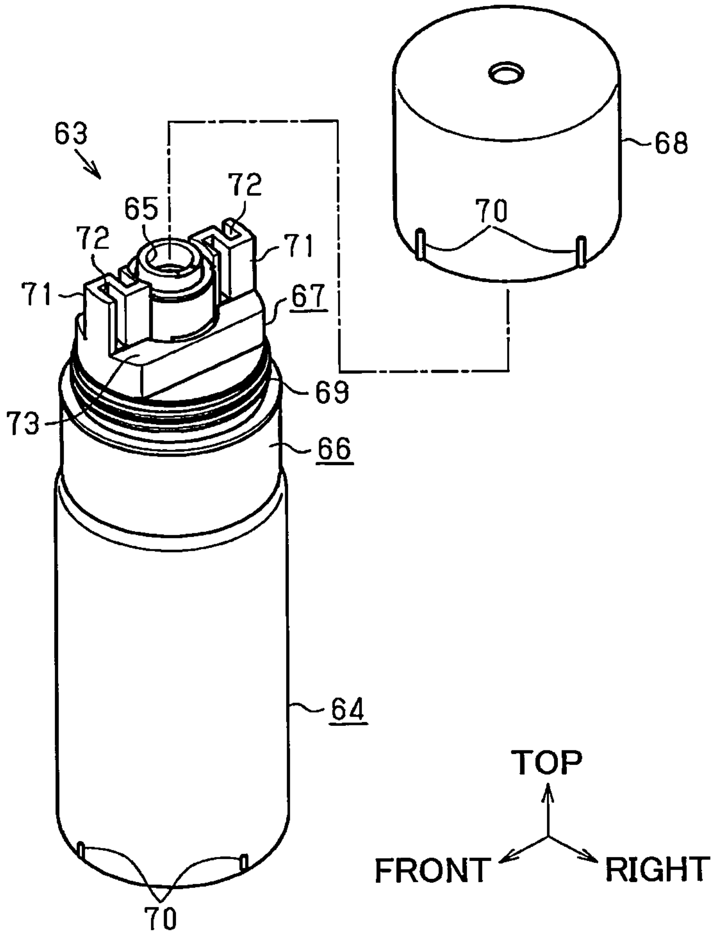
FIG. 6 is a perspective view illustrating an ink refill container according to a first embodiment.
Figure 7:
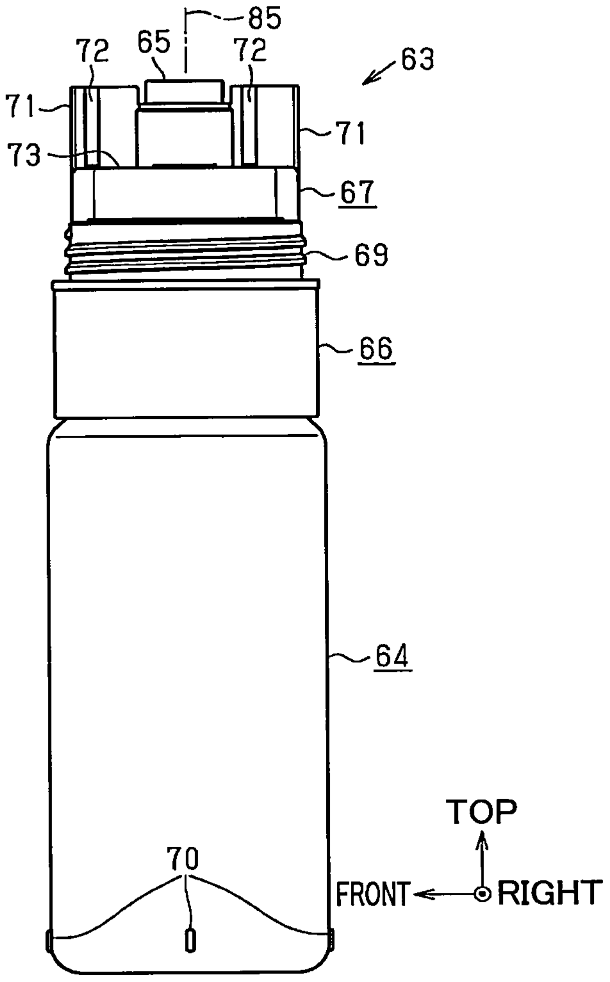
FIG. 7 is a side view illustrating the ink refill container.
Figure 8:
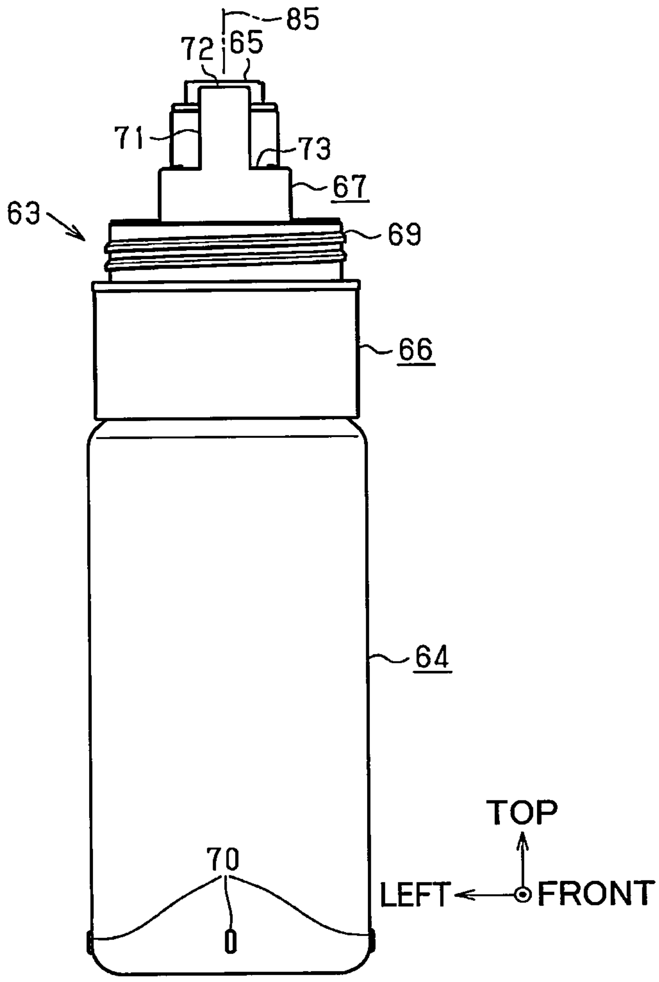
FIG. 8 is a front view illustrating the ink refill container.

As shown in FIGS. 6 to 8, the ink refill container 63 according to the first embodiment includes a container main body 64 formed as a main body in a cylindrical shape, and an ink outlet forming portion 66 provided in a leading end of the container main body 64 to include an ink outlet 65 that is formed as an opening at its leading end to allow ink to flow out from the ink refill container 63. Part of a leading end side of the ink outlet forming portion 66 according to the embodiment is formed by a separate container additional portion 67 that is added to surround the ink outlet 65. The ink outlet forming portion 66 may be provided integrally with an edge of the container main body 64 or may be provided separately. The container additional portion 67 may be formed integrally with the leading end side of the ink outlet forming portion 66, in place of the separate structure added to the ink outlet forming portion 66.

The ink outlet 65 of the ink outlet forming portion 66, along with the surrounding container additional portion 67, is covered by a bottomed tubular cap 68 to be hidden from outside during storage of the ink refill container 63. A male threaded portion 69 is formed in an outer circumferential face at a cylindrical lower edge of the container additional portion 67, while a non-illustrated female threaded portion is formed in an inner circumferential face of the cap 68. Screwing the female threaded portion of the cap 68 with the male threaded portion 69 of the container additional portion 67 mounts the cap 68 to the leading end of the ink refill container 63 such as to cover the ink outlet 65.

The entire outer surface of the container additional portion 67 is colored in a specific color. More specifically, the outer surface of the container additional portion 67 is colored in the same color as the color of ink contained in the container main body 64, which the container additional portion 67 is added to. From this point of view, the container additional portion 67 serves as a second portion that externally indicates information regarding the ink contained in the ink refill container 63. For example, the outer surface of the container additional portion 67 in the ink refill container 63 that contains black ink is colored in black. A plurality of (according to the embodiment, four) protrusions 70 are formed at equal angular intervals (for example, at intervals of 90 degrees) on outer circumferential faces of respective base ends of the container main body 64 and the cap 68. These protrusions 70 are formed with a view to preventing rolling of the ink refill container 63 in the cylindrical shape. Additionally, the container main body 64 of the ink refill container 63 that contains black ink may be formed to be thicker than the container main bodies 64 of the ink refill containers 63 that contain the other color inks. In this case, the ink outlet forming portions 66 for black ink and for the other color inks may have common thicknesses and common shapes.

Figure 22:
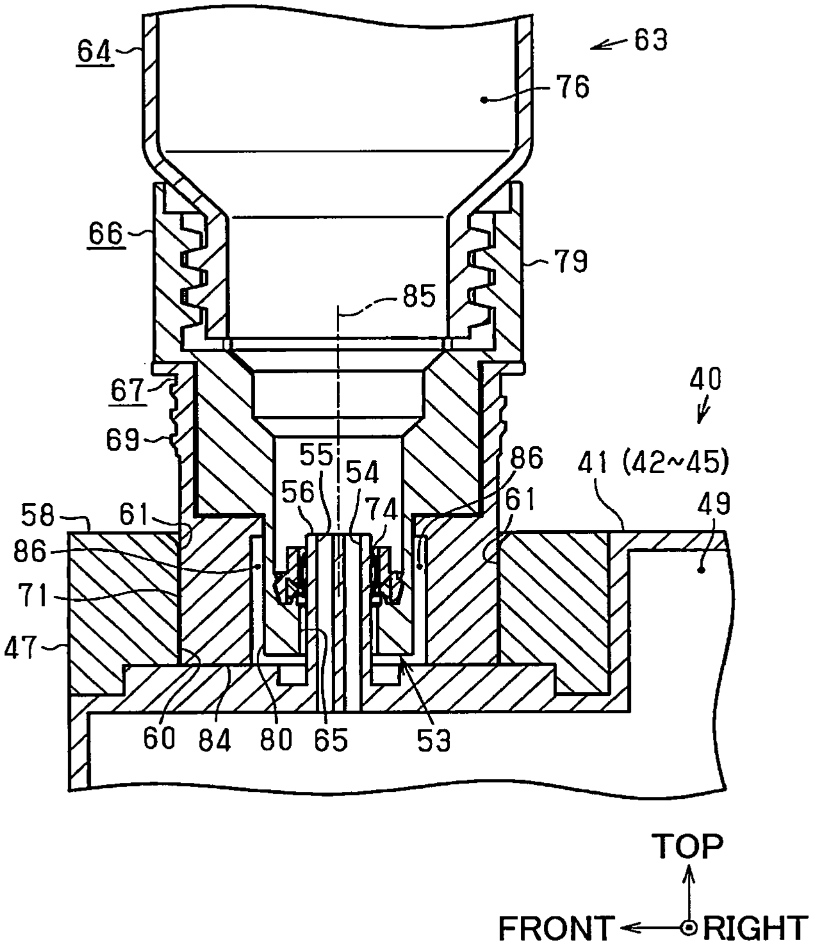
FIG. 22 is a partially broken side view illustrating an ink refill system according to the third embodiment.
Figure 23:
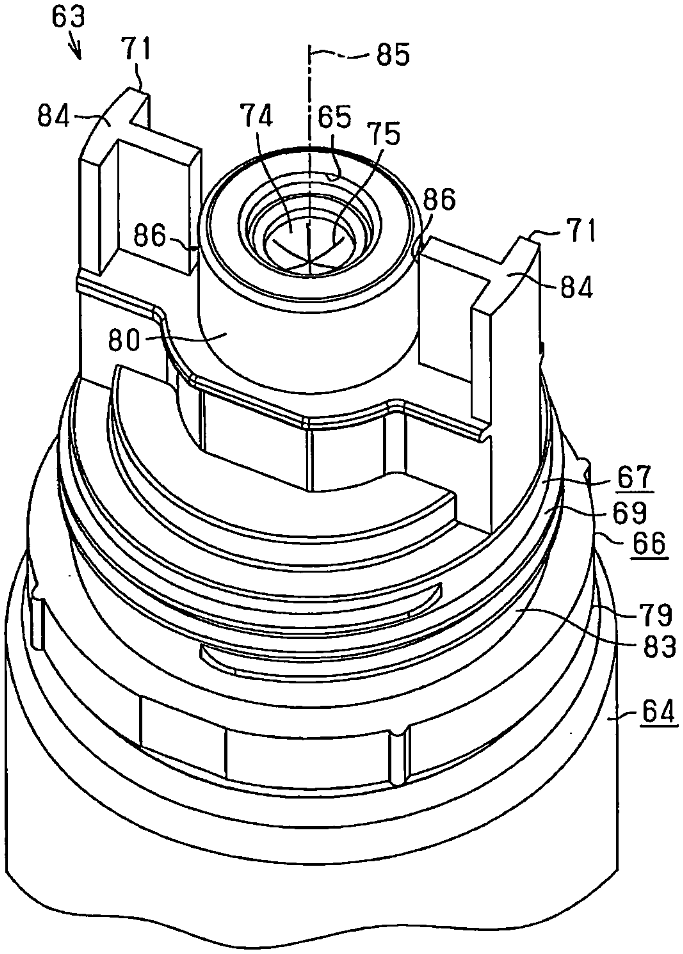
FIG. 23 is a partial perspective view illustrating an ink refill container according to a fourth embodiment.

As shown in FIGS. 6 to 8, projections 71 are formed in an area outside of the ink outlet 65 in a radial direction around the ink outlet 65 as the center and at a position above the cylindrical lower edge of the outer circumferential face of the container additional portion 67 with the male threaded portion 69 formed thereon, such as to be protruded upward that is an opposite direction to the direction where the container main body 64 is placed relative to the ink outlet 65 in the direction of a center axis 85 of the ink outlet 65. When the leading end of the needle 56 on the ink inlet 53-side is inserted into the ink outlet 65, these projections 71 serve as a second fitting element that is fit in the recesses 61 formed in the upper face 58 of the ink refill adapter 47 as a first filling element. The projections 71 are provided in a pair to be arranged on the respective sides in the radial direction (front and rear sides in the drawings) across the ink outlet 65, like the pair of recesses 61 arranged on the front side and the rear side across the ink inlet 53. As shown in FIG. 6 and FIG. 7, the projections 71 are formed on the inner side of the outer circumferential face of the container main body 64 in the radial direction around the ink outlet 65 as the center in the ink refill container 63. The ink refill container 63 shown in FIG. 7 has the ink outlet 65 that is protruded more upward than the projections 71, which is an opposite direction to the direction where the container main body 64 is placed. In place of this configuration, the projections 71 may be protruded more upward than the ink outlet 65 as shown in FIG. 22 and FIG. 23.

Figure 9:
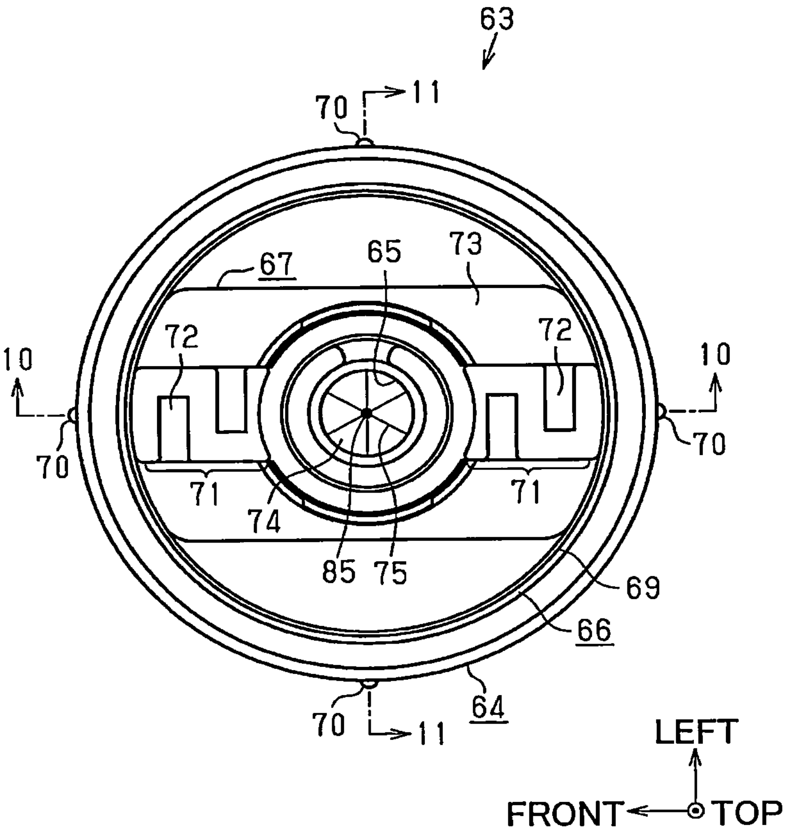
FIG. 9 is a plan view illustrating the ink refill container.

As shown in FIG. 6 and FIG. 9, second concavo-convex elements (second key structures) 72 are formed on outer face of the respective projections 71 (both left and right side faces in FIGS. 6 and 9) such as to be engaged with the first concavo-convex elements (first key structures) 62 formed on the inner face of the recesses 61 of the ink refill adapter 47. The second concavo-convex elements 72 are provided to be extended along the protruding direction of the projections 71 (in other words, along the direction of the center axis 85 of the ink outlet 65). When the projections 71 are fit in the recesses 61 and the second concave-convex elements 72 are engaged with the first concavo-convex elements 62, the ink outlet 65 of the ink refill container 63 is connected with the ink inlet 53 of corresponding one of the ink tanks 41 to 45.

A positioning structure 73 in a planar shape that is orthogonal to (intersects with) the center axis 85 of the ink outlet 65 is provided between the cylindrical lower edge of the container additional portion 67 with the male threaded portion 69 formed therein and the projections 71 with the second concavo-convex elements 72 formed thereon, such as to be located on the outer side of the ink outlet 65 in the radial direction when the ink outlet 65 is viewed in the direction of the center axis 85. Accordingly, the positioning structure 73 forms part of the outer surface of the container additional portion 67 that is part of the outer surface of the ink refill container 63 and is provided at a position on the container main body 64-side of the leading end of the projections 71 in the direction of the center axis 85 of the ink outlet 65. This positioning structure 73 is provided in the container additional portion 67 that is added to the ink outlet forming portion 66 in the ink refill container 63 and is accordingly the structure provided on the outside of the ink outlet forming portion 66.

As shown in FIG. 9, a valve 74 is made of an elastic material such as a silicon film and is provided inside of the ink outlet 65 formed in the ink outlet forming portion 66 to seal the ink outlet 65 in an openable and closable manner. The valve 74 is provided at such a position that the positioning structure 73 is located on the container main body 64-side in the direction of the center axis 85 of the ink outlet 65 (as shown in, for example, FIG. 14). A plurality of (according to the embodiment, three) slits 75 are provided in the valve 74 to intersect with the center of the valve 74 as a point of intersection at equal angular intervals (for example, at intervals of 120 degrees). The valve 74 is opened by spreading these slits 75 from outside to inside of the ink outlet 65. Accordingly, the valve 74 that is a normally closed valve is spread inward to be opened by the leading end of the needle 56 when the leading end of the needle 56 on the ink inlet 53-side is inserted into the ink outlet 65.

In this process, the positioning structure 73 on the outer side of the ink outlet 65 in the radial direction comes into contact with the upper face 58 of the ink refill adapter 47 with the through hole 60 including the ink inlet 53 and the recesses 61 formed therein, so as to position the valve 74 relative to corresponding one of the ink tanks 41 to 45 in the direction of the center axis 85 of the ink outlet 65. From this point of view, the positioning structure 73 in the planar shape serves as a positioning surface that is extended in the direction orthogonal to (intersecting with) the center axis 85 of the ink outlet 65. The upper face 58 of the ink refill adapter 47, on the other hand, serves as a receiving surface that receives the positioning structure 73 in the planar shape and that is part of the corresponding one of the ink tanks 41 to 45, which the positioning structure 73 of the ink refill container 63 comes into contact with, when the valve 74 in the ink outlet 65 of the ink refill container 63 is opened for the purpose of refilling ink to the corresponding one of the ink tanks 41 to 45.

Figure 10:
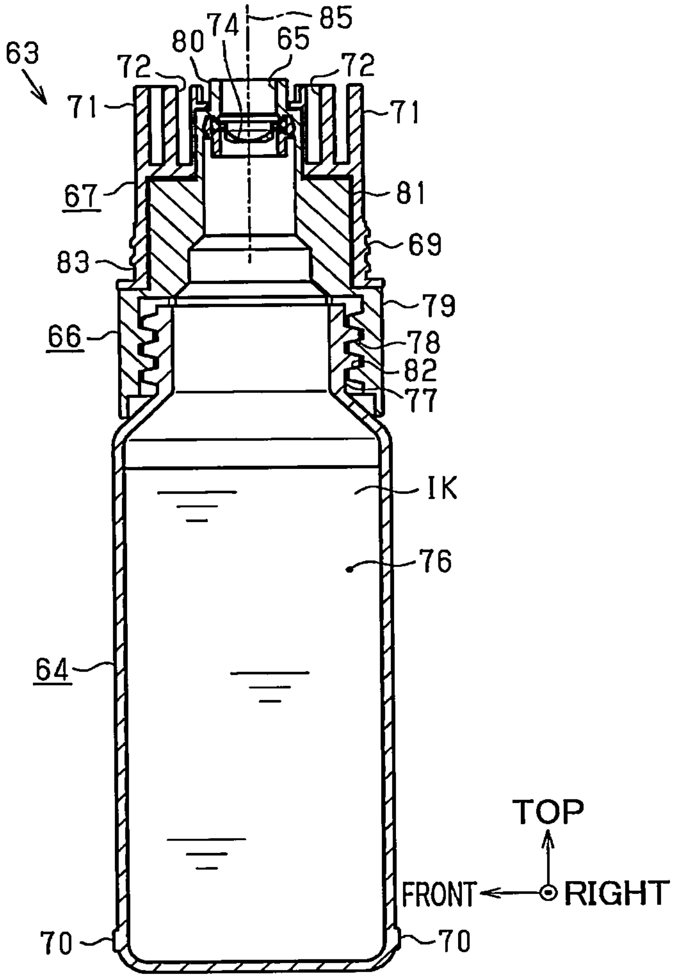
FIG. 10 is a sectional view taken along an arrow 10-10 in FIG. 9.
Figure 11:
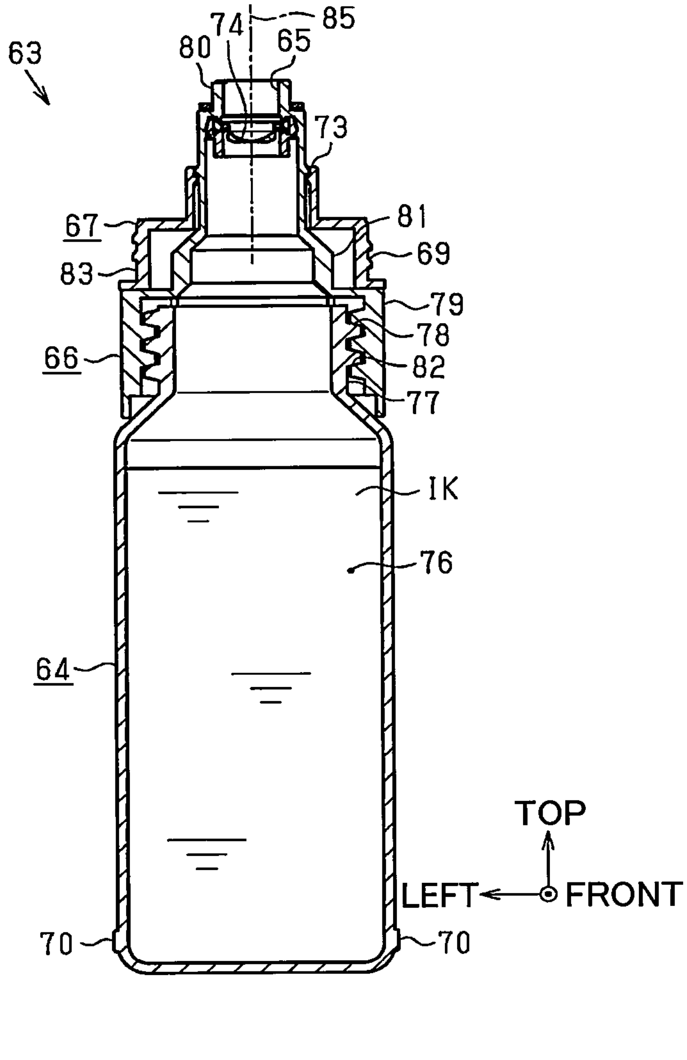
FIG. 11 is a sectional view taken along an arrow 11-11 in FIG. 9.

As shown in FIG. 10 and FIG. 11, the container main body 64 of the ink refill container 63 is a member in a bottle-like shape having an ink chamber 76 to contain the ink IK inside thereof, and a male threaded portion 78 is formed on an outer circumferential face of a neck portion 77 on an upper edge of the container main body 64. The ink outlet forming portion 66 provided on the upper edge of the container main body 64, on the other hand, includes a large diameter section 79 that is located on the outer circumferential side of the neck portion 77 of the container main body 64, a small diameter section 80 that is provided at a position farthermost from the container main body 64 as a tubular section with the ink outlet 65 formed to open outside, and a middle section 81 that is provided to couple the large diameter section 79 with the small diameter section 80. Screwing a female threaded portion 82 formed on an inner circumferential face of the large diameter section 79 with the male threaded portion 78 formed on the outer circumferential face of the neck portion 77 of the container main body 64 mounts the ink outlet forming portion 66 to the upper edge of the container main body 64.

In the container additional portion 67 added to the ink outlet forming portion 66 of the ink refill container 63 such as to surround the ink outlet 65, its lower end face at the cylindrical lower edge of the outer circumferential face with the male threaded portion 69 forms a joint structure 83 that is joined with the upper end face of the large diameter section 79 of the ink outlet forming portion 66. This joint structure 83 is joined with the large diameter section 79 of the ink outlet forming portion 66 such that plane regions opposed to each other in the front-rear direction of its inner circumferential face are in contact with the outer faces on the front side and on the rear side of the middle section 81 of the ink outlet forming portion 66.

The following describes the functions of the ink refill system configured as described above or more specifically the functions when the ink refill container 63 is used to refill ink to each of the ink tanks 41 to 45 of the ink supply unit 40.

The following description is on the assumption that the liquid surface of ink in the ink tank 41 for black ink located on the rightmost side among the plurality of the ink tanks 41 to 45 arranged side by side is lowered to the height of the lower limit mark 52 provided in the lower part of the visible portion 50 as shown in FIG. 2. Accordingly, the following describes the case where ink is refilled to this ink tank 41. It is also assumed that black ink is sufficiently contained in the ink refill container 63 used for ink refill and that the cap 68 is removed in advance from the ink refill container 63. Furthermore, it is assumed that the shape of the second concavo-convex elements 72 formed on the outer face of the projections 71 of the ink refill container 63 matches with the shape of the first concavo-convex elements 62 formed on the inner face of the recesses 61 located on the front side and the rear side of the ink inlet 53 for the ink tank 41 and that the second concavo-convex elements 72 are engageable with the first concave-convex elements 62 accompanied with insertion of the projections 71 into the recesses 61.

In the process of ink refill to the ink tank 41, the user first rotates the open/close door 35 of the housing 22 forward around the rotating shaft 36 as the center from the closed state shown in FIG. 1 to open the open/close door The upper face 58 of the ink refill adapter 47 with the ink inlets 53 for the ink tanks 41 to 45 in the ink supply unit 40 is accordingly exposed outside of the housing 22. This allows the user to connect the ink outlet 65 of the ink refill container 63 downward with a desired ink inlet 53.

Figure 12:
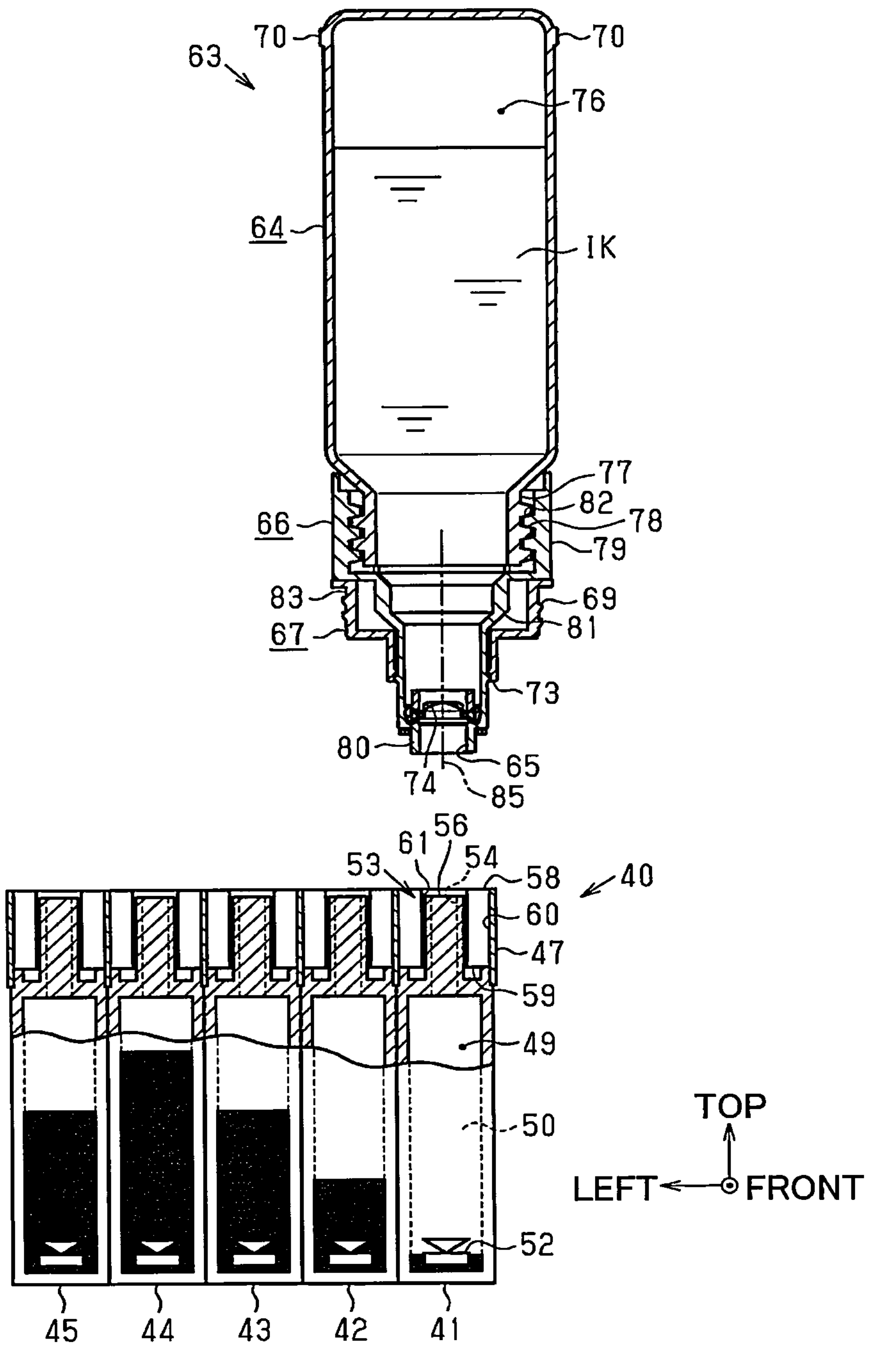
FIG. 12 is a partially broken front view illustrating an ink refill system immediately before an ink refill operation.
Figure 13:
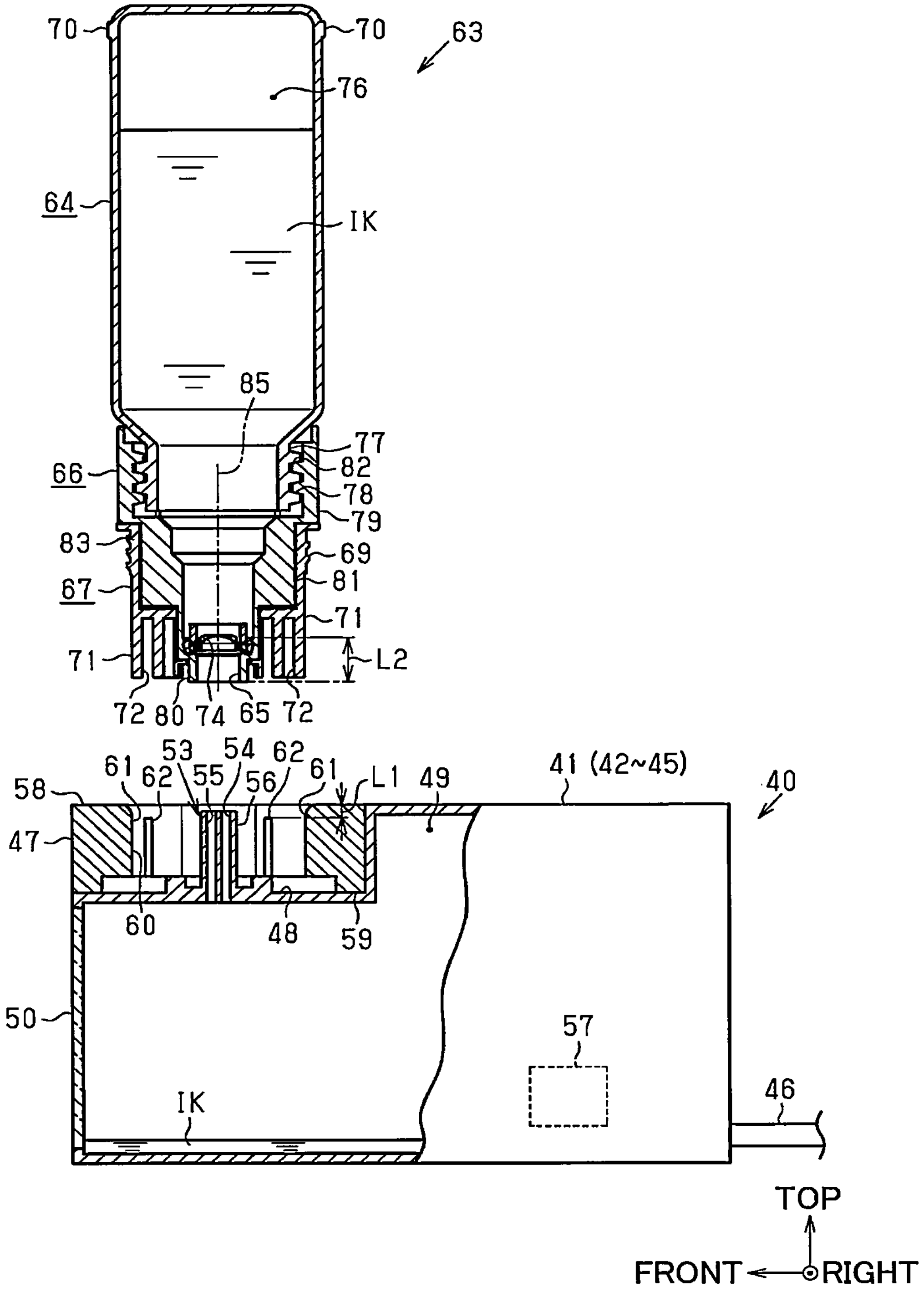
FIG. 13 is a partially broken side view illustrating the ink refill system immediately before the ink refill operation.

As shown in FIG. 12 and FIG. 13, the user turns the ink refill container 63 containing black ink used for ink refill upside down and holds the ink outlet 65 to be located above the through hole 60 on the rightmost side in the ink refill adapter 47. This aligns the center axis 85 of the ink outlet 65 of the ink refill container 63 with the center axis of the ink inlet 53 of the ink tank 41 that is the object of ink refill. The user compares the color of the container additional portion 67 (second portion) of the ink refill container 63 held in the hand with the color of the peripheral portion of the upper opening edge of the through hole 60 (first portion) provided with the ink inlet 53 of the ink tank 41 as the object of ink refill. When the respective colors are the same color (black in this case), the user confirms that the ink refill container 63 suitable for the current ink refill is held in the hand and shifts to a subsequent operation for ink refill.

The ink refill container 63 is then lowered from the state shown in FIG. 12 and FIG. 13, so that the projections 71 of the ink refill container 63 are inserted into the recesses 61 of the ink refill adapter 47 integrated with the ink tank 41. The insertion of the projections 71 into the recesses 61 assures alignment of the center axis 85 of the ink outlet 65 with the center axis of the ink inlet 53. In this case, the recesses 61 are arranged to be symmetric with respect to the needle 56 at the center of the ink inlet 53, so that each projection 71 is insertable into either of the recesses 61. Accordingly, there is no need to check the suitable positional relationship between the recesses 61 and the projections 71 by rotating the ink refill container 63 around the center axis 85 of the ink outlet 65 multiple times. The user can thus readily insert the projections 71 into the recesses 61.

At this moment, the projections 71 are only slightly inserted into the recesses 61. The leading end of the needle 56 located at the center of the ink inlet 53 is inserted in the opening of the ink outlet 65 that is slightly protruded from the leading end of the projections 71 but does not reach the valve 74 that is located in the depth of the ink outlet 65. This is because a distance L2 between the leading ends of the projections 71 and the valve 74 in the ink outlet 65 is greater than a distance L1 between the upper face 58 of the ink refill adapter 47 where the opening edges of the recesses 61 are located and the upper edge of the first concavo-convex elements 62 in the recesses 61 as shown in FIG. 13. When the projections 71 are further inserted downward that is the depth direction of the recesses 61 from this state, the second concavo-convex elements 72 on the outer face of the projections 71 are engaged with the first concavo-convex elements 62 on the inner face of the recesses 61. When the projections 71 are further inserted toward the bottom face in the depth direction of the recesses 61 with keeping this engagement, the leading end of the needle 56 in the ink inlet 53 reaches the position of the valve 74 in the ink outlet 65 and thereby opens the valve 74.

Figure 14:
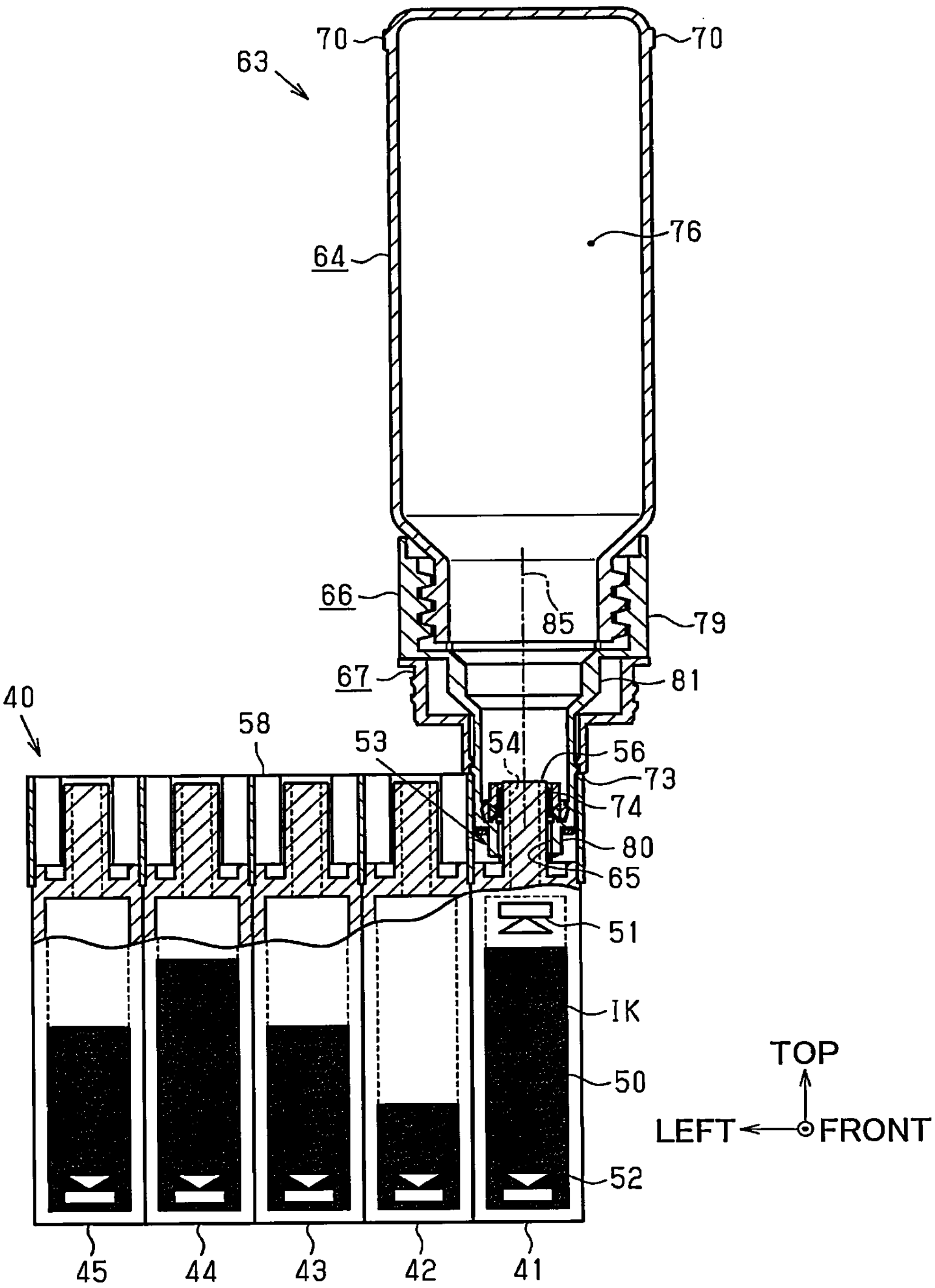
FIG. 14 is a partially broken front view illustrating the ink refill system during the ink supply operation.
Figure 15:
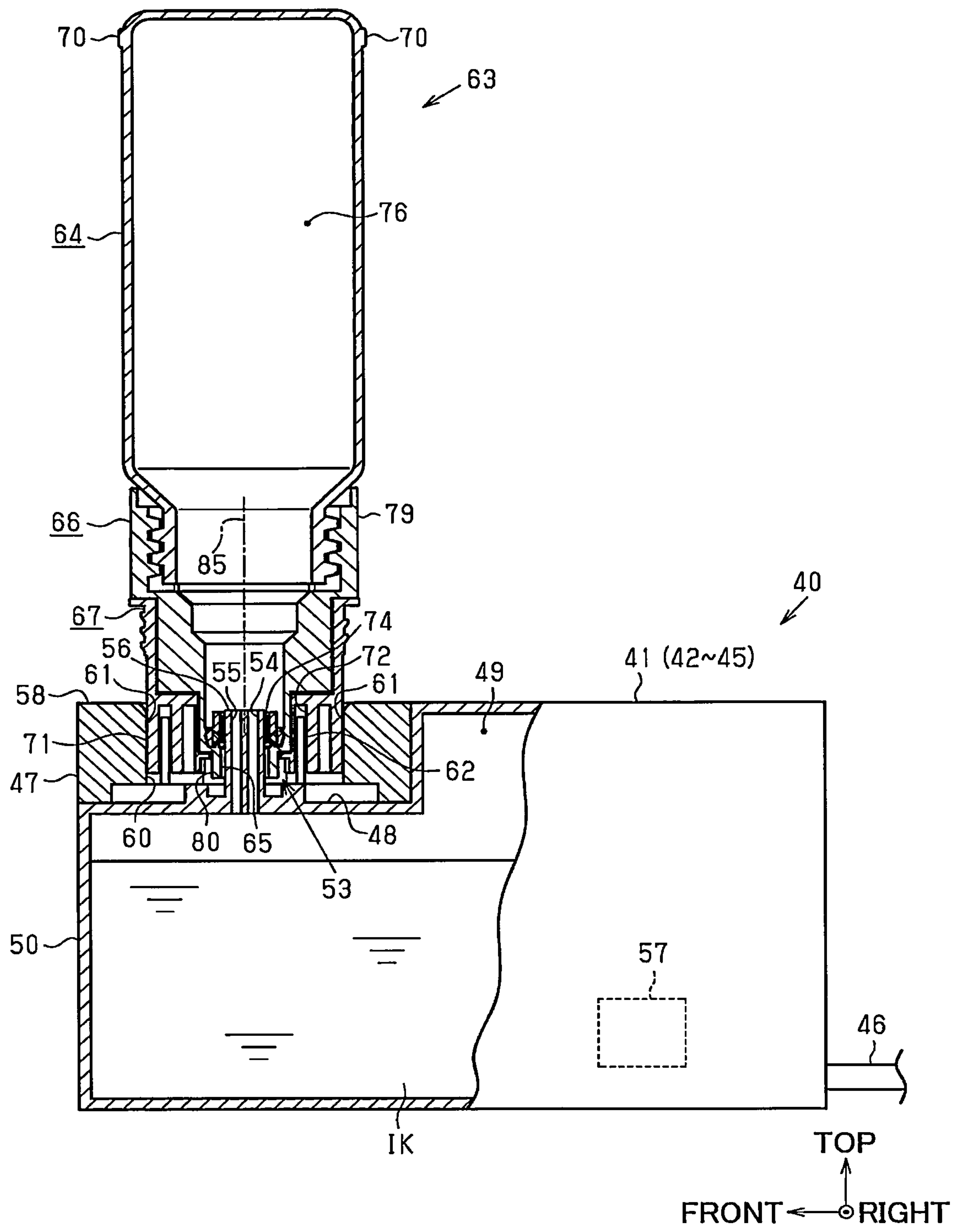
FIG. 15 is a partially broken side view illustrating the ink refill system during the ink supply operation.

As shown in FIG. 14 and FIG. 15, the leading end of the needle 56 spreads the slits 75 of the valve 74 upward (i.e., inward of the ink outlet 65), so as to open the valve 74. As a result, the ink outlet 65 of the ink refill container 63 is connected with the needle 56 in the ink inlet 53 of the ink tank 41, so that black ink is refilled from the ink refill container 63 to the ink tank 41. In this process, one flow path out of the two flow paths 54 and 55 formed in the needle 56 in the ink inlet 53 serves as an ink flow path which ink flows in, while the other flow path serves as an air flow path which the air flows in. For example, when the user inclines the ink refill container 63 to connect the ink outlet 65 with the ink inlet 53, one of the two flow paths 54 and 55 serving as the ink flow path is changed according to the direction of the inclination.

In the case of a failure in engagement of the second concavo-convex elements 72 with the first concavo-convex elements 62 after insertion of the projections 71 into the recesses 61, the user can recognize that the ink refill container 63 which the user tries to insert is a wrong ink refill container 63 containing a different color ink other than black at this moment. A configuration that the upper edge of the first concavo-convex elements 62 and the opening edge of the recesses 61 are located at the same height rejects not only engagement of the second concavo-convex elements 72 with the first concavo-convex elements 62 but insertion of the projections 71 into the recesses 61. The user is likely to try insertion of the projections 71 into the recesses 61 many times and waste the operating time. According to the embodiment, on the other hand, the height of the first concavo-convex elements 62 is lower than the opening edge of the recesses 61. This causes the projections 71 to be readily guided toward the bottom face in the depth direction of the recesses 61 in the process of insertion into the recesses 61 and thereby suppresses an unnecessarily long time from being taken.

Figure 16:
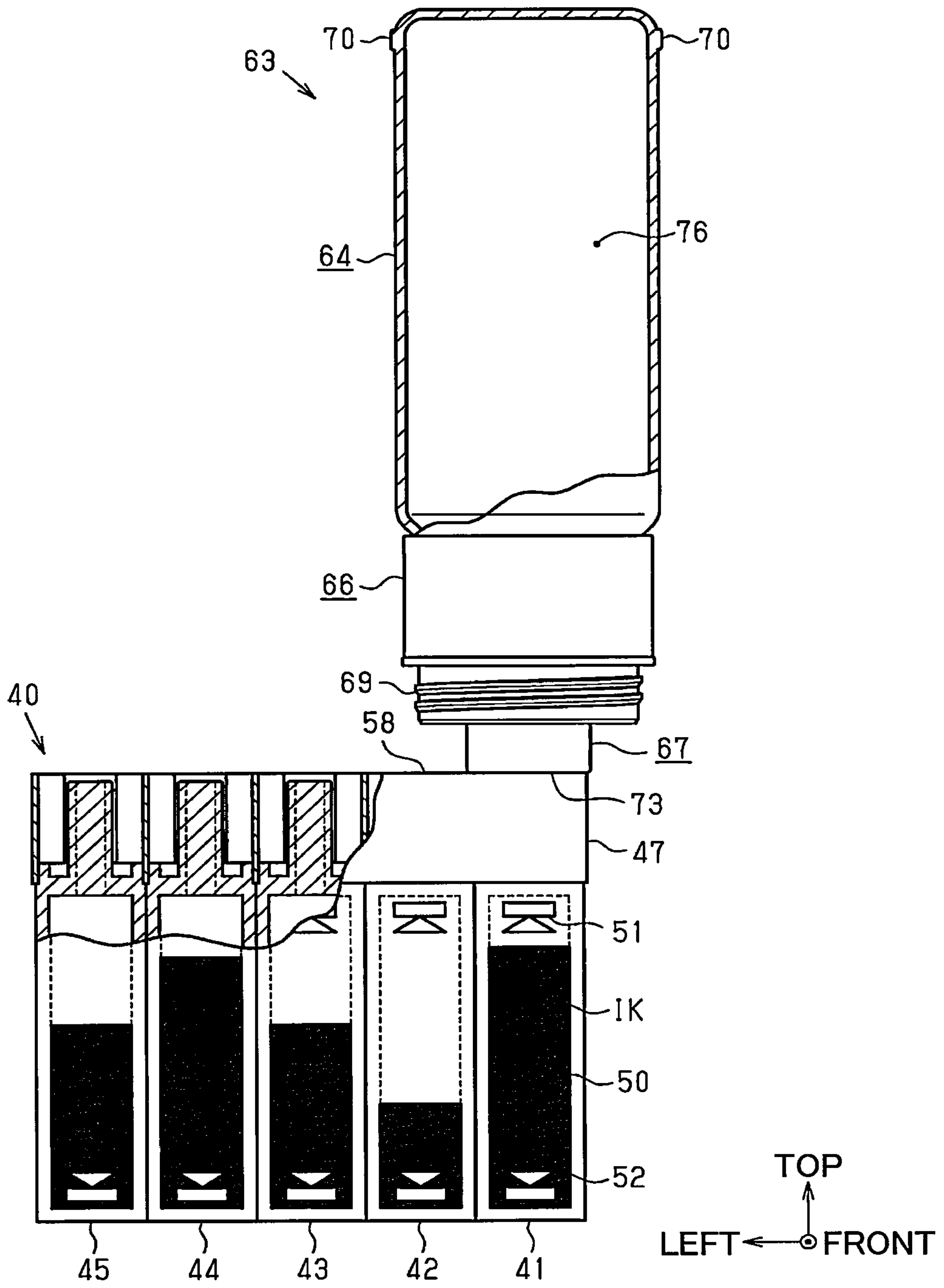
FIG. 16 is a partially broken front view illustrating the ink refill system in a positioning state.
Figure 17:
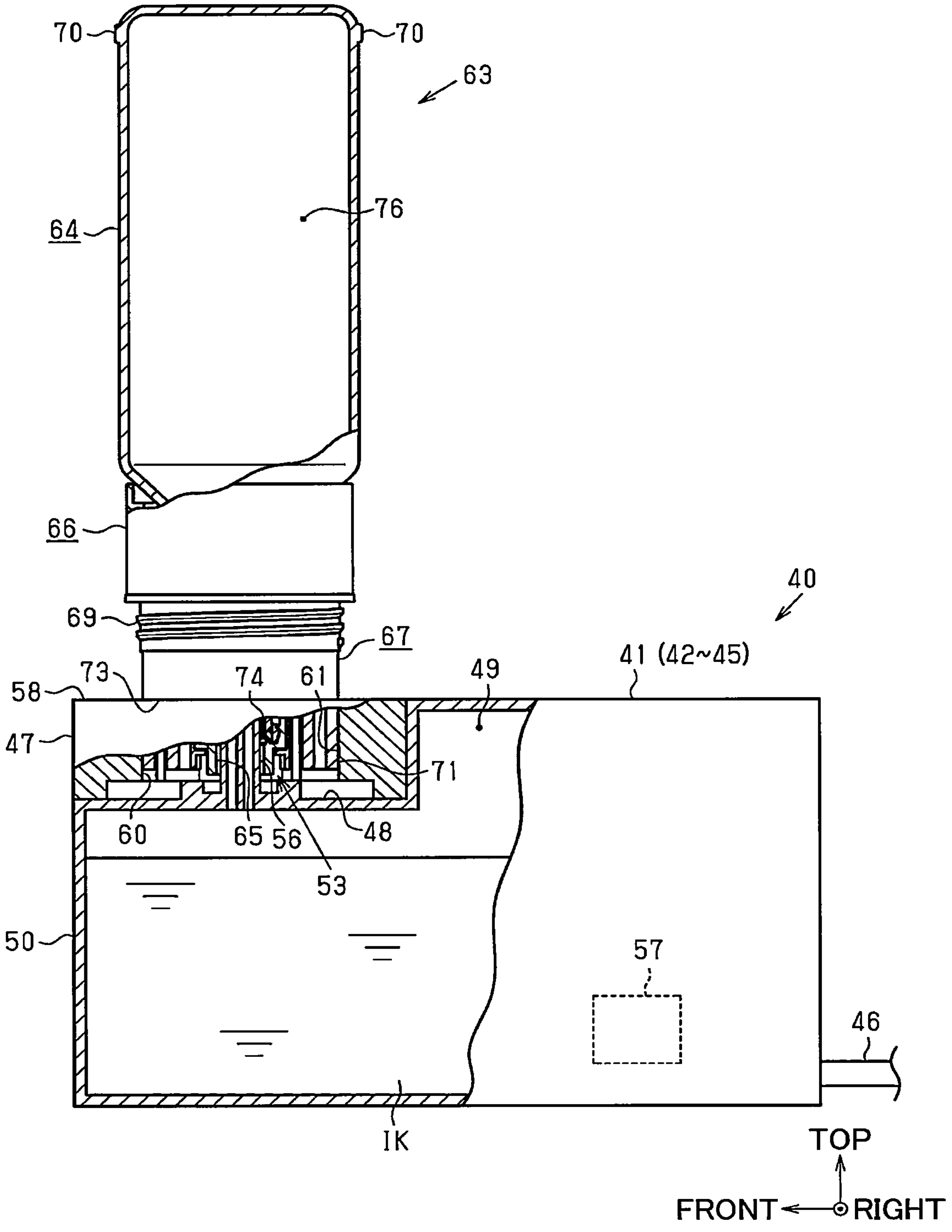
FIG. 17 is a partially broken side view illustrating the ink refill system in the positioning state.

Additionally, as shown in FIG. 14, FIG. 16, and FIG. 17, when the needle 56 in the ink inlet 53 of the ink tank 41 (42 to 45) opens the valve 74 in the ink outlet 65 of the ink refill container 63, the positioning structure 73 of the ink refill container 63 comes into contact with the upper face 58 of the ink refill adapter 47 that is part of the ink tank 41 (42 to 45). More specifically, the positioning structure 73 in the planar shape of the ink refill container 63 that serves as the positioning surface extended in the direction orthogonal to (intersecting with) the center axis 85 of the ink outlet 65 abuts on the upper face 58 of the ink refill adapter 47, so that the valve 74 is opened in the state of being positioned in the direction of the center axis of the ink outlet 65 relative to the needle 56 of the ink tank 41 (42 to 45).

In this process, the positioning structure 73 is located on the outer side of the ink outlet 65 in the radial direction, so that the ink refill container 63 is stably kept in the attitude that the ink outlet 65 is connected with the ink inlet 53. As shown in FIG. 14 and FIG. 15, when the positioning structure 73 of the ink refill container 63 abuts on the upper face 58 of the ink refill adapter 47, there is a gap between the bottom face of the ink inlet 53 where the base end of the needle 56 in the ink inlet 53 is located and the leading end of the ink outlet 65 of the ink refill container 63. Ink is likely to be accumulated on the bottom face where the base end of the needle 56 in the ink inlet 53 is located. This configuration, however, prevents the accumulated ink from adhering to the leading end of the ink outlet 65 to stain the ink refill container 63.

As shown in FIG. 14 and FIG. 16, when the liquid surface of ink in the ink tank 41 is still lower than the height of the upper limit mark 51 of the visible portion 50 on completion of ink refill from the ink refill container 63 to the ink tank 41, the ink refill may be performed again to further add ink to the upper limit mark 51 by using the same black ink refill container 63. The above description on the ink refill operation with regard to the black ink tank 41 is similarly applicable to the other color ink tanks 42 to 45.

The first embodiment described above has the following advantageous effects:

(1-1) In the process of ink refill to each of the ink tanks 41 to 45, the positioning structure 73 in the planar shape of the ink refill container 63 that serves as the positioning surface extended in the direction orthogonal to (intersecting with) the center axis 85 of the ink outlet 65 abuts on the upper face 58 of the ink refill adapter 47 that is part of the corresponding one of the ink tanks 41 to 45. This stabilizes the attitude of the ink refill container 63 in the direction orthogonal to (intersecting with) the center axis 85 of the ink outlet 65. The valve 74 is accordingly opened in the state of being positioned relative to the corresponding one of the ink tanks 41 to 45. This facilitates the ink refill operation and thereby enables each of the ink tanks 41 to 45 to be adequately refilled with ink.

(1-2) The valve 74 is configured by the slit valve that is formed from an elastic material, for example, a silicon film and that is provided with one or more slits 75. This provides the ink refill container 63 having the simple configuration by using a less number of components.

(1-3) In the process of connecting the ink refill container 63 inclined along the radial direction in which the two flow paths 54 and 55 are arrayed from the extended direction of the needle 56, with one of the ink tanks 41 to 45, one flow path out of the two flow paths 54 and 55 which the ink outlet 65 of the ink refill container 63 approaches first serves as the ink flow path, while the other flow path serves as the air flow path. Since either of the two flow paths 54 and 55 is usable as the ink flow path, the user can promptly perform the ink refill operation without dithering to select the flow path serving as the ink flow path.

Second Embodiment

The following describes a second embodiment with reference to drawings. In subsequent respective embodiments including this second embodiment, part of the configuration of the ink refill container 63 is different from that of the first embodiment, while the other configuration is substantially similar to that of the first embodiment. Hereinafter, the like components to those of the first embodiment are expressed by the like reference signs, and repeated description is omitted.

Figure 18:
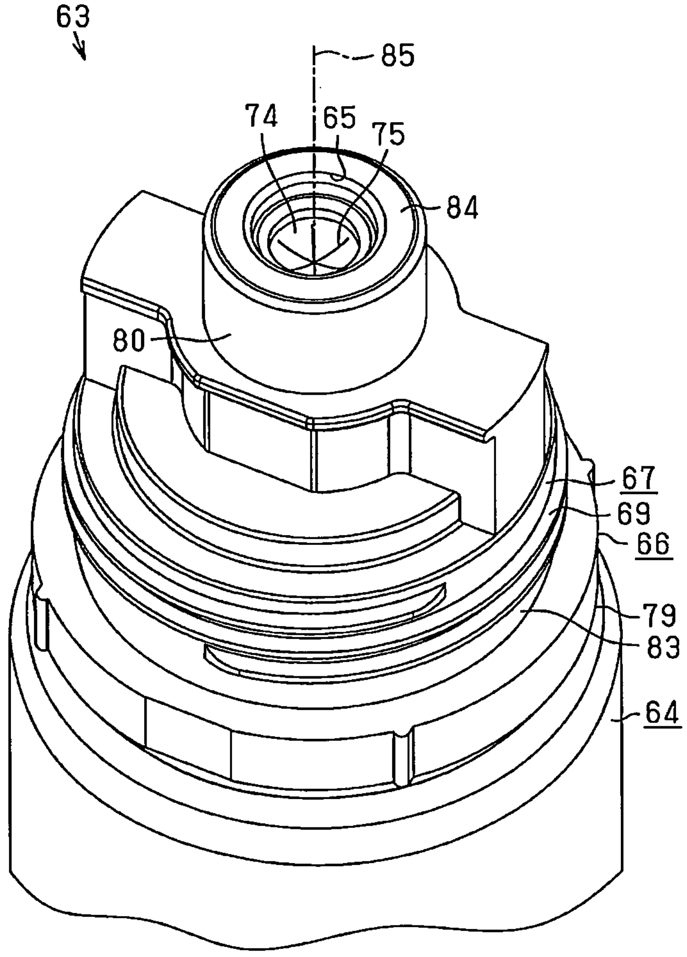
FIG. 18 is a partial perspective view illustrating an ink refill container according to a second embodiment.

As shown in FIG. 18, an ink refill container 63 according to the second embodiment is configured such that a small diameter section 80 as one exemplary tubular portion forming an ink outlet 65 that is open outward at a leading end of an ink outlet forming portion 66 servers as a positioning structure. More specifically, the small diameter section 80 in a cylindrical shape has a leading end face in a planar shape that is orthogonal to (intersects with) a center axis 85 of the ink outlet 65. This leading end face forms a positioning surface 84 extended in a direction orthogonal to (intersecting with) the center axis 85 of the ink outlet 65.

As shown in FIG. 18, the positioning surface 84 is configured by the leading end face of the small diameter section 80 with the ink outlet 65 formed on the inner circumferential side thereof. Accordingly, the positioning surface 84 is located on an opposite side to a container main body 64 across a valve 74 that is located in the depth from an opening edge of the ink outlet 65 in the small diameter section 80, in a direction along the center axis 85 of the ink outlet 65. In other words, the positioning surface 84 is protruded from the valve 74 toward the side of ink flowing out from the ink outlet 65 (hereinafter also called "container leading end side") in the direction along the center axis 85 of the ink outlet 65.

The positioning surface 84 is configured by the leading end face that is a part farthermost from the container main body 64 in the direction along the center axis 85 of the ink outlet 65. Accordingly, the positioning surface 84 is located on the container leading end side, which is the opposite side to the container main body 64, of the ink outlet 65 formed on the inner circumferential side of the small diameter section 80, in the direction along the center axis 85 of the ink outlet 65. The small diameter section 80 as the tubular portion according to this embodiment has such a shape that is fittable in the ink inlet 53 in the approximately circular hole shape with the needle (ink inlet flow path portion) 56 located at the center thereof in the through hole (hereafter also called "tank-side through hole") 60 of the ink refill adapter 47 integrated with the ink tank 41 (42 to 45).

Figure 19:
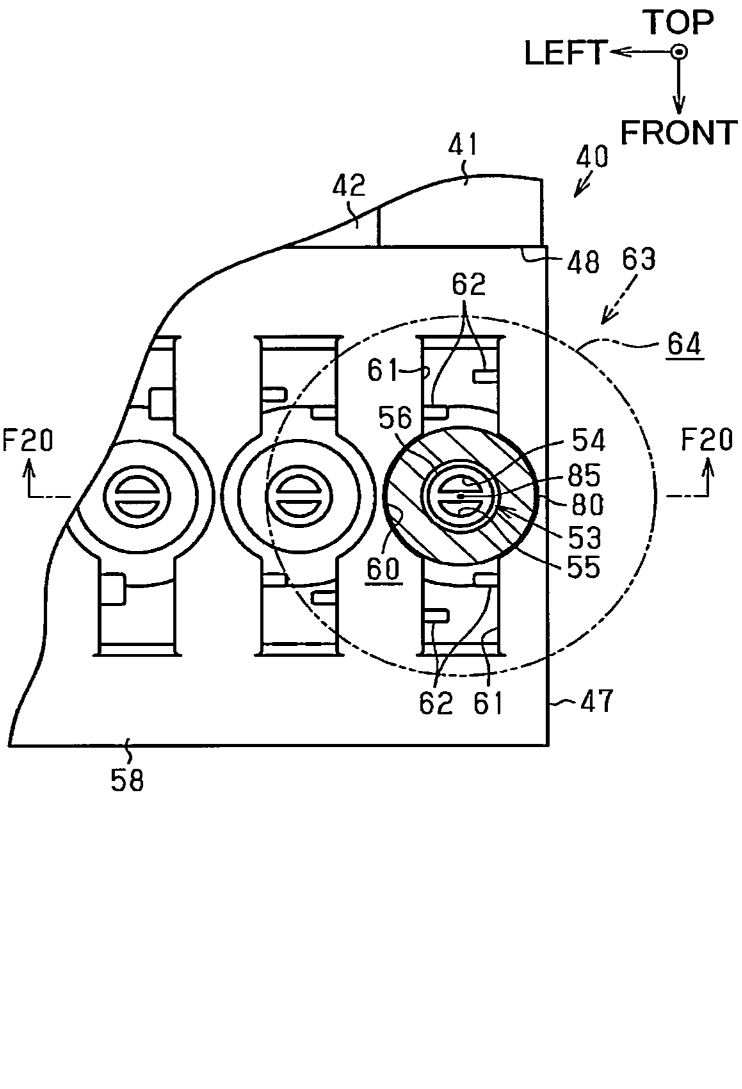
FIG. 19 is a partial plan view illustrating an ink supply unit in an ink refill process according to the second embodiment.
Figure 20:
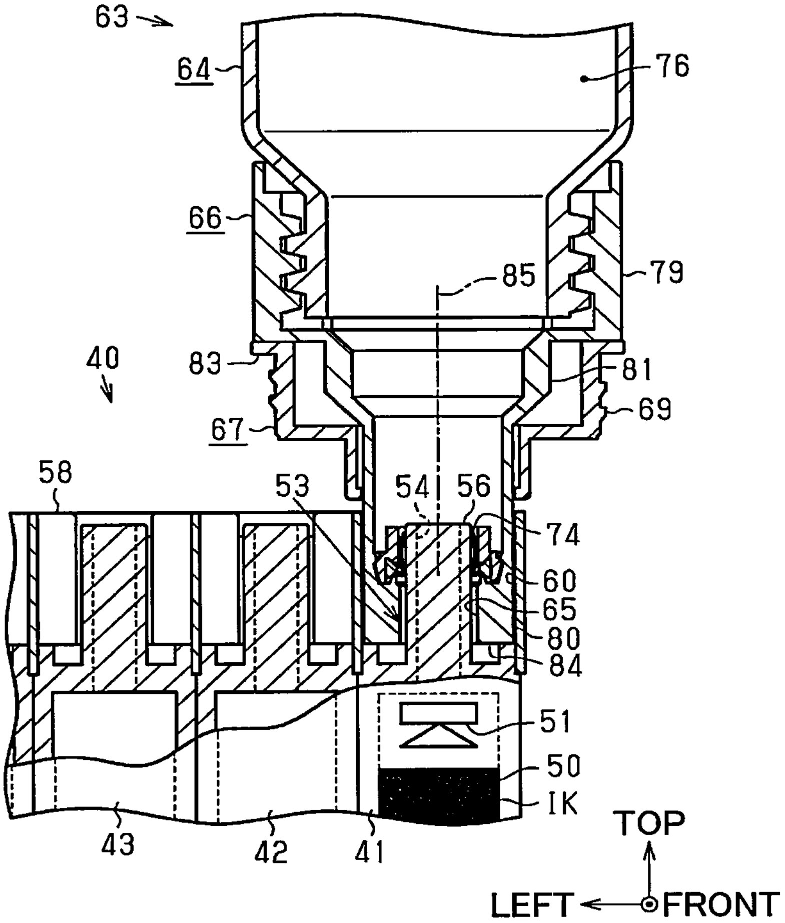
FIG. 20 is a sectional view taken along an arrow F20-F20 in FIG. 19.

As shown in FIG. 19 and FIG. 20, in the process of ink refill from the ink refill container 63 of the second embodiment to the ink tank 41 (42 to the small diameter section 80 with the ink outlet 65 formed on the inner circumferential side thereof is inserted downward into the through hole 60 of the ink tank. More specifically, the small diameter section 80 serving as the positioning structure is fit and inserted into the ink inlet 53 in the approximately circular hole shape of the through hole 60, such that the center axis of the ink outlet 65 is aligned with the center axis 85 of the ink inlet 53.

In the process of moving the ink refill container 63 toward the ink tank 41 (42 to 45), the positioning surface 84 at the leading end of the small diameter section 80 moves toward the ink tank 41 (42 to 45), prior to the valve 74 in the depth of the ink outlet 65. An outer circumferential face (outer face) of the small diameter section 80 in the cylindrical shape of the ink refill container 63 then slides against an arc face forming an inner circumferential face (inner face) of the ink inlet 53 in the direction along the center axis 85 of the ink outlet 65. In other words, the positioning surface 84 as the leading end face of the small diameter section (positioning structure) 80 in the cylindrical shape slides against the arc face forming the inner circumferential face of the ink inlet 53 in the tank-side through hole so as to be guided in such a direction that the needle 56 is inserted into the ink outlet 65.

While the small diameter section 80 of the ink refill container 63 moves toward the bottom of the through hole 60 in the state that the positioning surface 84 at its leading end is inserted in the ink inlet 53 of the tank-side through hole 60, the leading end of the needle 56 in the ink inlet 53 moves upward and reaches the position of the valve 74 in the ink outlet so that the needle 56 opens the valve 74. When the small diameter section 80 of the ink refill container 63 further moves toward the bottom of the through hole 60 from this state, the positioning surface 84 at the leading end of the small diameter section 80 comes into contact with the bottom. The positioning surface 84 provided at the leading end of the small diameter section 80 and extended in the direction orthogonal to (intersecting with) the center axis 85 of the ink outlet 65 abuts on the bottom of the tank-side through hole 60, so that the attitude of the ink refill container 63 is stabilized. This results in opening the valve 74 in the state of being positioned relative to the needle 56 on the ink tank 41 (42 to 45)-side in the direction of the center axis 85 of the ink outlet 65.

The second embodiment described above has the following advantageous effects, in addition to the advantageous effects (1-2) and (1-3) described above:

(2-1) When the ink refill container 63 is moved toward the ink tank 41 (42 to 45) and the needle (ink inlet flow path portion) 56 of the ink tank 41 (42 to 45) is inserted into the ink outlet 65 to open the valve 74, the positioning surface 84 that is the leading end face of the small diameter section (positioning structure) 80 in the cylindrical shape moves toward the ink tank 41 (42 to 45), prior to the valve 74. In this process, the positioning surface 84 at the leading end of the small diameter section 80 is guided by the arc face forming the inner circumferential face of the ink inlet 53 in the through hole 60 and is thereby smoothly moved in such a direction that the needle 56 is inserted into the ink outlet 65. As a result, this configuration causes the needle (ink inlet flow path portion) 56 to be readily guided to the valve 74 in the ink refill process.

(2-2) When the ink refill container 63 is moved toward the ink tank 41 (42 to 45) and the needle (ink inlet flow path portion) 56 of the ink tank 41 (42 to 45) is inserted into the ink outlet 65 to open the valve 74, the positioning surface 84 at the leading end of the small diameter section 80 approaches the ink tank 41 (42 to 45), prior to the ink outlet 65 on the inner circumferential side of the small diameter section 80. This configuration readily prevents the ink outlet 65 from colliding with other members when the ink refill container 63 approaches the ink tank 41 (42 to 45). This accordingly protects the ink outlet 65 and readily prevents adhesion of ink to other members.

(2-3) The attitude of the ink refill container 63 is stabilized in the direction intersecting with the center axis 85 of the ink outlet 65, when the positioning surface 84 abuts on the bottom of the tank-side through hole 60 in the process of ink refill to the ink tank 41 (42 to 45). This configuration facilitates ink refill and enables the ink tank 41 (42 to 45) to be adequately refilled with ink by using the ink refill container 63.

(2-4) In the ink refill container 63, the positioning surface 84 is formed on the small diameter section (tubular portion) 80 that forms, along with the ink outlet 65, part of the ink outlet forming portion 66. This simplifies the configuration, compared with formation of the positioning surface 84 on part of a projection or the like provided at a different position from the ink outlet 65.

Third Embodiment

The following describes a third embodiment with reference to drawings.

Figure 21:
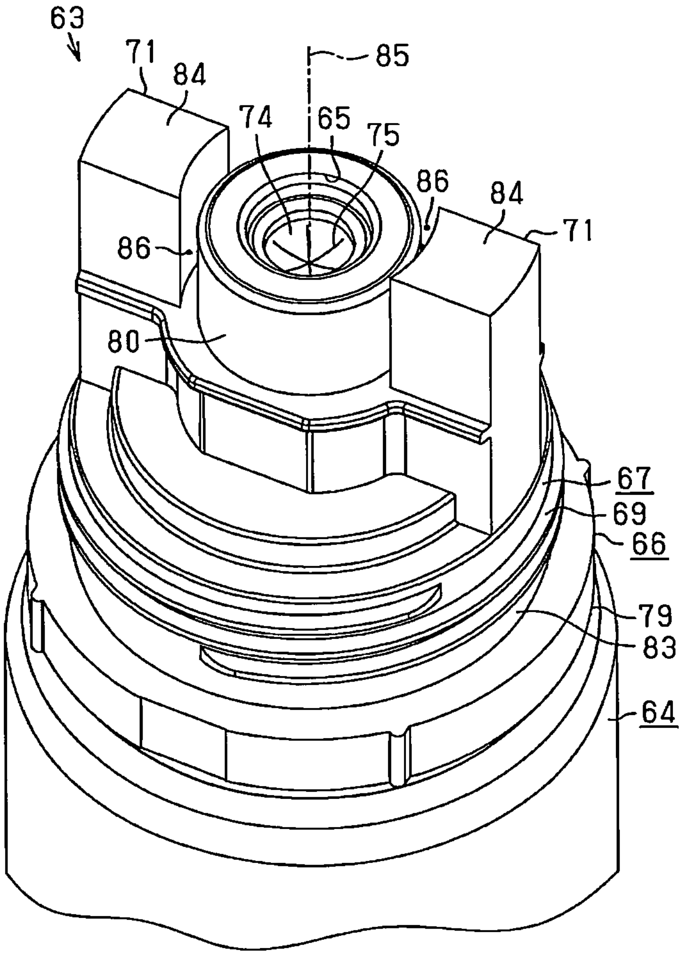
FIG. 21 is a partial perspective view illustrating an ink refill container according to a third embodiment.

As shown in FIG. 21, an ink refill container 63 according to the third embodiment is configured such that projections 71 protruded from a position on the outer side of an ink outlet 65 in a radial direction around the ink outlet 65 as the center toward the container leading end side in a direction along a center axis 85 of the ink outlet 65 serve as a positioning structure. More specifically, the projections 71 have leading end faces in a planar shape that are orthogonal to (intersects with) the center axis 85 of the ink outlet 65. These leading end faces form positioning surfaces 84 extended in a direction orthogonal to (intersecting with) the center axis 85 of the ink outlet 65.

As shown in FIG. 21, the projections 71 are protruded from a small diameter section 80 having the ink outlet 65 that is formed on an inner circumferential face side thereof and that is provided with a valve 74 located in the depth, toward the container leading end side that is the opposite side to a container main body 64, in the direction along the center axis 85 of the ink outlet 65. Accordingly, the positioning surfaces 84 as the leading end faces of the projections 71 are located on the container leading end side, which is the opposite side to a container main body 64, of the ink outlet 65 and the valve 74, in the direction along the center axis 85 of the ink outlet 65.

The projections 71 are provided in a region exposed outside of a container additional portion 67 that is part of an ink outlet forming portion 66. More specifically, the projections 71 are provided in a portion outside of the ink outlet 65 in the ink refill container 63 in the radial direction around the ink outlet 65 as the center. The projections 71 have a planar shape that is fittable in the recesses 61 in the approximately rectangular shape arrayed in the front-rear direction across the ink inlet 53 in the approximately circular hole shape located at the center in the through hole 60 of the ink tank 41 (42 to 45). Slit-like clearances 86 are formed between an outer circumferential face (outer face) of the small diameter section 80 in the cylindrical shape and outer faces of the projections 71 opposed to this outer circumferential face, such as to draw in the ink adhering to the leading end face of the small diameter section 80 and the leading end faces (positioning surfaces 84) of the projections 71 by capillary phenomenon. The configuration of the third embodiment does not have first concavo-convex elements 62 that are formed on the inner face of the recesses 61 in the through hole 60 of the ink tank 41 (42 to 45) of the first embodiment.

As shown in FIG. 21, in the process of ink refill from the ink refill container 63 of the third embodiment to the ink tank 41 (42 to 45), the projections 71 and the small diameter section 80 at the leading end of the ink refill container 63 are inserted downward into the tank-side through hole 60. More specifically, the projections 71 are inserted into the recesses 61 in the tank-side through hole 60, and the small diameter section 80 is subsequently inserted into the ink inlet 53 in the through hole 60.

In the process of moving the ink refill container 63 toward the ink tank 41 (42 to 45), the positioning surfaces 84 at the leading end of the projections 71 move toward the ink tank 41 (42 to 45), prior to the ink outlet 65 of the small diameter section 80 and the valve 74 in the depth of the ink outlet 65. The outer faces of the projections 71 in the ink refill container 63 then slide against the inner faces of the recesses 61 in the tank-side through hole 60 in the direction along the center axis 85 of the ink outlet 65. In other words, the positioning surfaces 84 as the leading end faces in the approximately rectangular shape of the projections 71 slide against the inner faces of the recesses 61 in the through hole 60, so as to be guided in such a direction that the needle 56 is inserted into the ink outlet 65.

While the projections 71 of the ink refill container 63 move toward the bottom of the through hole 60 in the state that the positioning surfaces 84 at their leading end are inserted in the recesses 61 of the tank-side through hole 60, the leading end of the needle 56 in the ink inlet 53 moves upward and reaches the position of the valve 74 in the ink outlet 65, so that the needle 56 opens the valve 74. When the projections 71 of the ink refill container 63 further move toward the bottom of the through hole 60 from this state, the positioning surfaces 84 at the leading end of the projections 71 come into contact with the bottom. The positioning surfaces 84 provided at the leading end of the projections 71 and extended in the direction orthogonal to (intersecting with) the center axis 85 of the ink outlet 65 abut on the bottom of the through hole 60, so that the attitude of the ink refill container 63 is stabilized. This results in opening the valve 74 in the state of being positioned relative to the needle 56 on the ink tank 41 (42 to 45)-side in the direction of the center axis 85 of the ink outlet 65.

When ink leaked out from the ink outlet 65 flows from the leading end face of the small diameter section 80 to spread outward in the radial direction, the ink is drawn into the clearances 86 formed between the outer circumferential face (outer face) of the small diameter section 80 and the outer faces of the projections 71 by capillary phenomenon. This configuration prevents the ink leaked out from the ink outlet 65 from remaining on the leading end face of the small diameter section 80 or from adhering to and solidifying on the positioning surfaces 84 as the leading end faces of the projections 71.

The third embodiment described above has the following advantageous effects, in addition to the advantageous effects (1-2), (1-3) and (2-3) described above:

(3-1) When the ink refill container 63 is moved toward the ink tank 41 (42 to 45) and the needle (ink inlet flow path portion) 56 of the ink tank 41 (42 to 45) is inserted into the ink outlet 65 to open the valve 74, the positioning surfaces 84 that are the leading end faces of the projections 71 move toward the ink tank 41 (42 to 45), prior to the valve 74. In this process, the positioning surfaces 84 at the leading end of the projections 71 are guided by the inner faces of the recesses 61 in the approximately rectangular shape in the tank-side through hole 60 in such a direction that the needle 56 is inserted into the ink outlet 65. As a result, this configuration causes the needle (ink inlet flow path portion) 56 to be readily guided to the valve 74 in the ink refill process.

(3-2) When the ink refill container 63 is moved toward the ink tank 41 (42 to 45) and the needle (ink inlet flow path portion) 56 of the ink tank 41 (42 to 45) is inserted into the ink outlet 65 to open the valve 74, the positioning surfaces 84 at the leading end of the projections 71 approach the ink tank 41 (42 to 45), prior to the ink outlet 65 on the inner circumferential side of the small diameter section 80. This configuration readily prevents the ink outlet 65 from colliding with other members when the ink refill container 63 approaches the ink tank 41 (42 to 45). This accordingly readily prevents damage of the ink outlet 65 and adhesion of ink to other members.

(3-3) The ink that is leaked out from the ink outlet 65 and adheres to the leading end face of the small diameter section 80 or the ink that adheres to the positioning surfaces 84 is drawn into the clearances 86 between the small diameter section 80 and the projections 71. This configuration reduces the possibility of ink dripping and external contamination.

(3-4) The projections 71 having the positioning surfaces 84 at the leading end are provided in the region exposed outside of the ink outlet forming portion 66 or more specifically at the position outside of the ink outlet 65 in the radial direction around the ink outlet 65 as the center. This configuration causes the projections 71 and the positioning surfaces 84 at their leading edge serving as the positioning structure to be readily visible from outside when the needle (ink inlet flow path portion) 56 of the ink tank 41 (42 to 45) is inserted into the ink outlet 65 of the ink refill container 63.

Fourth Embodiment

The following describes a fourth embodiment with reference to a drawing.

As shown in FIG. 23, like the third embodiment, an ink refill container 63 according to the fourth embodiment is configured such that projections 71 protruded from a position on the outer side of an ink outlet 65 in a radial direction around the ink outlet 65 as the center toward the container leading end side in a direction along a center axis 85 of the ink outlet 65 serve as a positioning structure. More specifically, the projections 71 are provided in a region exposed outside of a container additional portion 67 that is part of an ink outlet forming portion 66, and leading end faces of the projections 71 form positioning surfaces 84 extended in a direction orthogonal to (intersecting with) a center axis 85 of the ink outlet 65. Slit-like clearances 86 are similarly formed between the projections 71 and a small diameter section 80.

Unlike the projections 71 of the third embodiment, however, in the projections 71 of the fourth embodiment, the positioning surfaces 84 as the leading end faces of the projections 71 are not in the approximately rectangular shape but are in an approximate T shape. More specifically, the positioning surface 84 of the fourth embodiment includes a portion linearly extended in the radial direction around the ink outlet 65 as the center and portions linearly extended leftward and rightward from respective outside ends in the radial direction of the portion linearly extended in the radial direction. Accordingly, a plane region of the positioning surface 84 farther from the ink outlet 65 in a direction intersecting with (in this case, orthogonal to) the center axis 85 of the ink outlet 65 has a larger width than a plane region of the positioning surface 84 closer to the ink outlet 65, with respect to a direction orthogonal to the radial direction around the ink outlet as the center (tangential direction). In other words, the positioning surfaces 84 of the fourth embodiment are configured such that the area of the positioning surface 84 abutting on the bottom of the through hole 60 on the side farther from the ink outlet 65 is larger than the area of the positioning surface 84 abutting on the bottom of the through hole 60 on the side closer to the ink outlet 65 in the direction intersecting with (in this case, orthogonal to) the center axis 85 of the ink outlet 65 when the positioning surfaces 84 are inserted into the through hole 60 of the ink tank 41 (42 to 45). The ink refill container 63 of the fourth embodiment basically has similar functions and advantageous effects to those of the ink refill container 63 of the third embodiment, except the functions and the advantageous effects based on the different shape of the positioning surfaces 84.

The fourth embodiment described above has the following advantageous effects, in addition to the advantageous effects (1-2), (1-3), (2-3) and (3-1) to (3-4) described above:

(4-1) In the case of insertion of the projections 71 into the through hole 60 of the ink tank 41 (42 to 45), the area of the projections 71 abutting on the bottom of the through hole 60 on the side farther from the ink outlet is larger than the area of the projections 71 abutting on the bottom of the through hole 60 on the side closer to the ink outlet 65 in the direction intersecting with (in this case, orthogonal to) the center axis 85 of the ink outlet 65. This configuration enhances the stability of the attitude of the ink outlet 65 in the ink refill state where the needle (ink inlet flow path portion) 56 is inserted into the ink outlet 65 to open the valve 74.

Fifth Embodiment

The following describes a fifth embodiment with reference to drawings.

Figure 24:
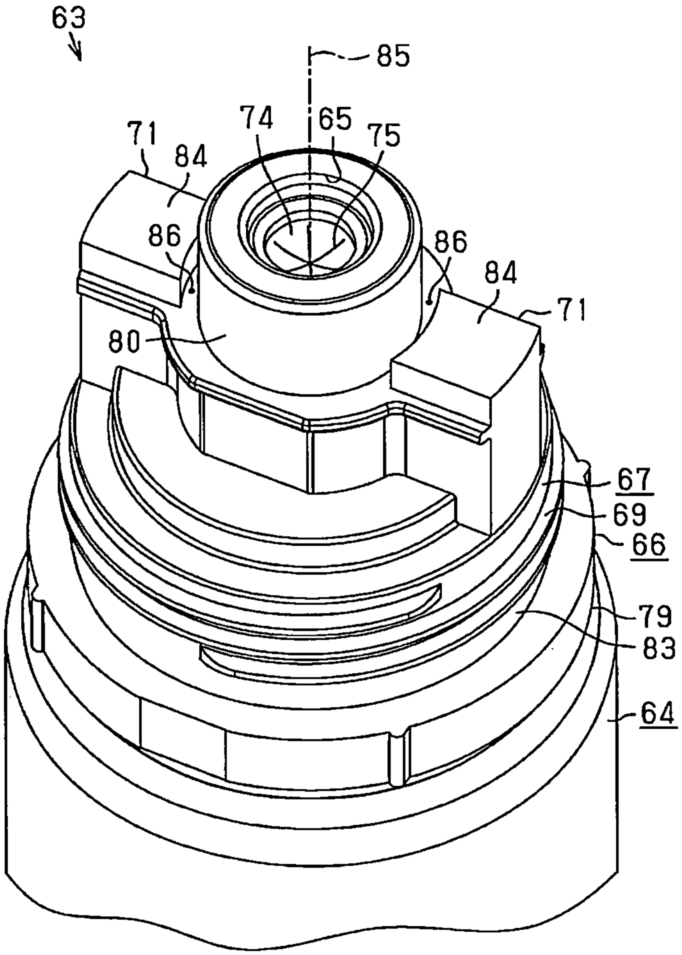
FIG. 24 is a partial perspective view illustrating an ink refill container according to a fifth embodiment.
Figure 25:
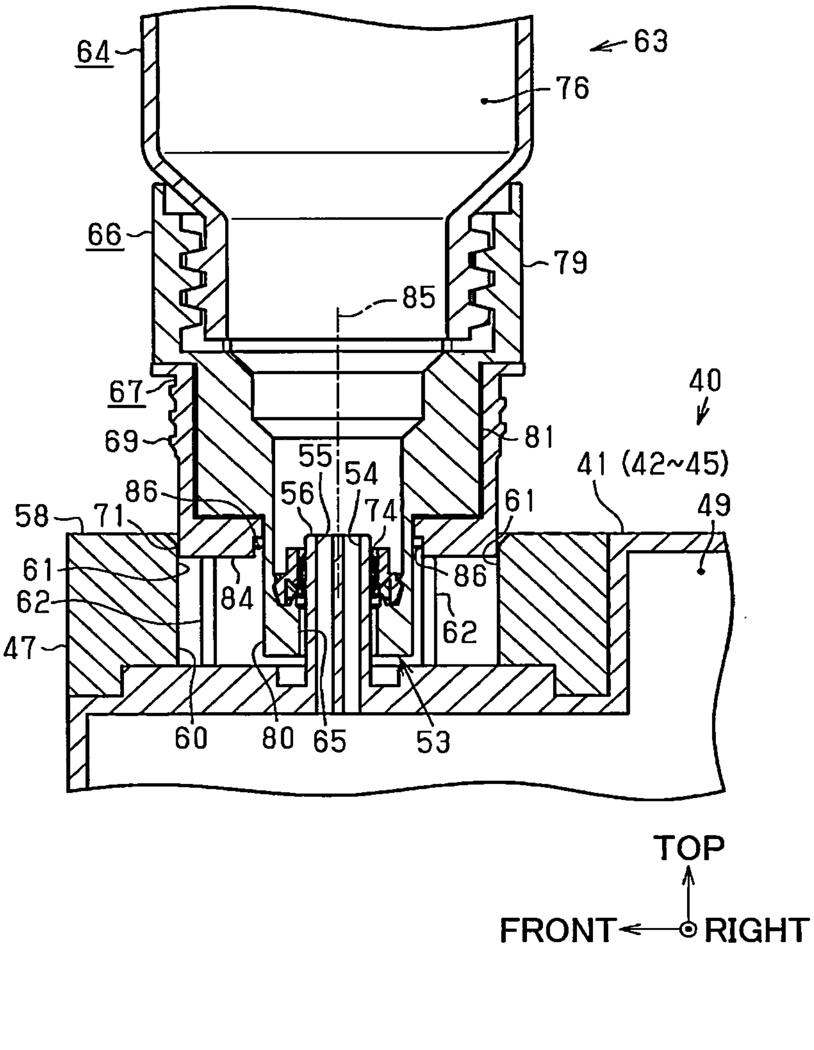
FIG. 25 is a partially broken side view illustrating an ink refill system according to the fifth embodiment.

As shown in FIG. 24 and FIG. 25, like the third embodiment and the fourth embodiment, an ink refill container 63 according to the fifth embodiment is configured such that projections 71 protruded from a position on the outer side of an ink outlet 65 in a radial direction around the ink outlet 65 as the center toward the container leading end side in a direction along a center axis 85 of the ink outlet 65 serve as a positioning structure. More specifically, the projections 71 are provided in a region exposed outside of a container additional portion 67 that is part of an ink outlet forming portion 66, and leading end faces of the projections 71 form positioning surfaces 84 extended in a direction orthogonal to (intersecting with) a center axis 85 of the ink outlet 65.

Slit-like clearances 86 are similarly formed between the projections 71 and a small diameter section 80.

Unlike the projections 71 of the third embodiment and the fourth embodiment, however, the height of protrusion of the projections 71 of the fifth embodiment toward the container leading end side in the direction along the center axis 85 of the ink outlet 65 is lower than the small diameter section 80. Accordingly, the positioning surfaces 84 of the fifth embodiment are located on a container base end side where a container main body 64 is located, of the ink outlet 65 and a valve 74 in the direction along the center axis 85 of the ink outlet 65.

As shown in FIG. 25, in the process of ink refill from the ink refill container 63 of the fifth embodiment to the ink tank 41 (42 to 45), the small diameter section 80 is inserted into the ink inlet 53 in the tank-side through hole 60, and the projections 71 are subsequently inserted into the recesses 61 in the through hole 60. In this case, prior to insertion of the positioning surfaces 84 at the leading end of the projections 71 of the ink refill container 63 into the recesses 61 of the tank-side through hole 60, the leading end of the needle 56 in the ink inlet 53 moves upward and reaches the position of the valve 74 in the ink outlet 65, so that the needle 56 opens the valve 74.

When the projections 71 of the ink refill container 63 are moved toward the bottom in the recesses 61 of the through hole 60 from the above state, the positioning surfaces 84 at the leading end of the projections 71 abut on first concavo-convex elements 62 that are provided as ribs extended in the vertical direction from the inner faces of the recesses 61. From this point of view, the first concavo-convex elements 62 serve as an abutting portion that abuts on the positioning surfaces 84 of the ink refill container 63 in the process of positioning the valve 74 inside of the ink outlet 65 relative to the ink tank 41 (42 to 45). The positioning surfaces 84 provided at the leading end of the projections 71 and extended in the direction orthogonal to (intersecting with) the center axis 85 of the ink outlet 65 abut on the first concavo-convex elements (abutting portion) 62 in the through hole 60, so that the attitude of the ink refill container 63 is stabilized. This results in opening the valve 74 in the state of being positioned relative to the needle 56 on the ink tank 41 (42 to 45)-side in the direction of the center axis 85 of the ink outlet 65.

The fifth embodiment described above has the following advantageous effects, in addition to the advantageous effects (1-2), (1-3), (3-3) and (3-4) described above:

(5-1) In the process of ink refill to the ink tank 41 (42 to 45), the positioning surfaces 84 abut on the first concavo-convex elements (abutting portion) 62 in the tank-side through hole 60, so that the attitude of the ink refill container 63 is stabilized in the direction intersecting with the center axis 85 of the ink outlet 65. This configuration facilitates ink refill and enables the ink tank 41 (42 to 45) to be adequately refilled with ink by using the ink refill container 63.

Sixth Embodiment

The following describes a sixth embodiment with reference to a drawing.

Figure 26:
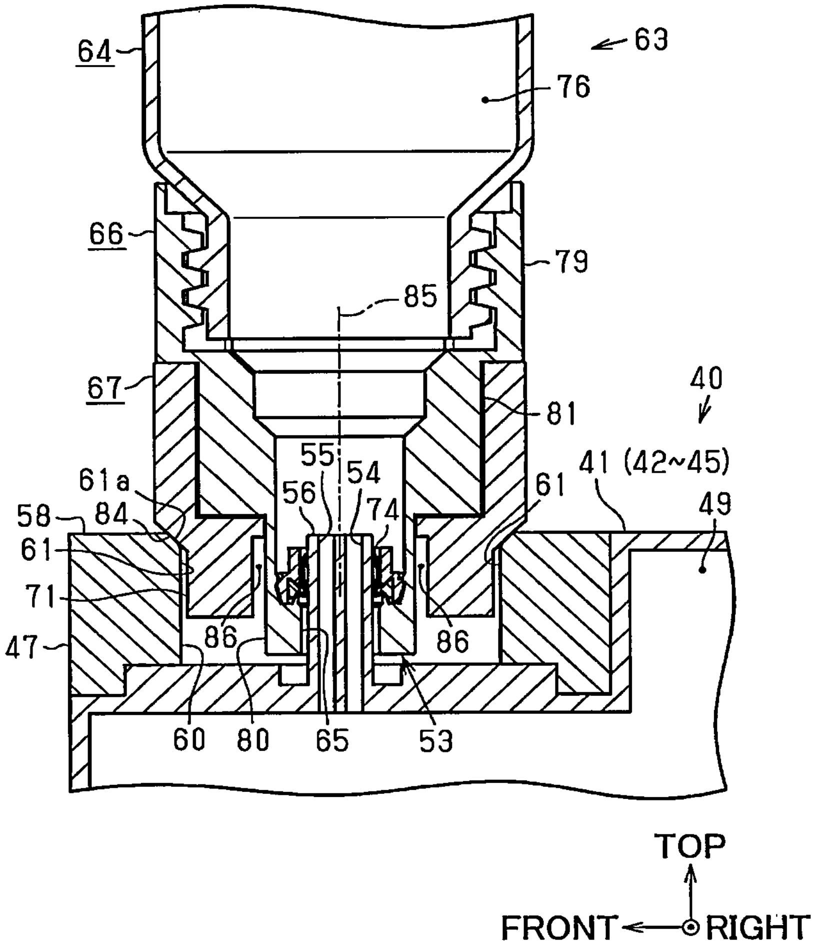
FIG. 26 is a partially broken side view illustrating an ink refill system according to a sixth embodiment.

As shown in FIG. 26, like the third to the fifth embodiments, an ink refill container 63 according to the sixth embodiment is configured such that projections 71 protruded from a position on the outer side of an ink outlet 65 in a radial direction around the ink outlet 65 as the center toward the container leading end side in a direction along a center axis 85 of the ink outlet 65 serve as a positioning structure. More specifically, the projections 71 are provided in a region exposed outside of a container additional portion 67 that is part of an ink outlet forming portion 66. Slit-like clearances 86 are similarly formed between the projections 71 and a small diameter section 80.

Unlike the projections 71 of the third to the fifth embodiments, however, in the projections 71 of the sixth embodiment, positioning surfaces that abut on part of the ink tank 41 (42 to 45) to open a valve 74 inside of the ink outlet 65 are not formed by leading end faces of the projections 71. In the projections 71 of the sixth embodiment, parts of outer faces (or outer circumferential faces) that face outside in the radial direction around the ink outlet 65 as the center are inclined in a direction intersecting with the center axis 85 of the ink outlet 65. Positioning surfaces 84 are formed by the inclined parts of the outer faces (or outer circumferential faces) of the projections 71. According to a modification, the positioning surfaces 84 may be curved in the direction intersecting with the center axis 85 of the ink outlet 65.

In this case, the positioning surfaces 84 are formed by conical surfaces or slant surfaces that are inclined in a direction gradually farther away from the center axis 85 of the ink outlet 65 toward a container base end side, which is the opposite side to the container leading end side (i.e., the side where a container main body 64 is located), with respect to the direction along the center axis 85 of the ink outlet 65. The projections 71 are formed such that parts of plane regions of the inclined positioning surfaces 84 exert the wedge effect to abut on the opening edge of the tank-side through hole 60 when the leading ends of the projections 71 are inserted into the tank-side through hole 60.

As shown in FIG. 26, in the process of ink refill from the ink refill container 63 of the sixth embodiment to the ink tank 41 (42 to 45), the small diameter section 80 is inserted into the ink inlet 53 in the tank-side through hole 60, and the projections 71 are subsequently inserted into the recesses 61 in the through hole 60. In this case, before the inclined positioning surfaces 84 of the projections 71 of the ink refill container 63 abut on the opening edge of the through hole 60 or the like, the leading end of the needle 56 in the ink inlet 53 moves upward and reaches the position of the valve 74 in the ink outlet 65, so that the needle 56 opens the valve 74. In the course of insertion of the small diameter section 80 into the ink inlet 53 of the through hole 60, the small diameter section 80 may be gradually guided along the inclined positioning surfaces 84 on the outer faces of the projections 71 from the state that the positioning surfaces 84 are in contact with the opening edge of the through hole 60.

When the projections 71 of the ink refill container 63 are moved toward the bottom in the recesses 61 of the tank-side through hole 60 from the above state, the inclined positioning surfaces 84 on the outer faces of the projections 71 abut on the opening edge of the through hole 60. In this case, the positioning surfaces 84 of the ink refill container 63 are positioned relative to the opening edge of the tank-side through hole 60 in a direction of gravity along the center axis 85 of the ink outlet 65 and in a horizontal direction orthogonal to the direction of gravity. The inclined positioning surfaces 84 on the outer faces of the projections 71 abut on the opening edge of the through hole 60, so that the attitude of the ink refill container 63 is stabilized. This results in opening the valve 74 in the state of being positioned relative to the needle 56 on the ink tank 41 (42 to 45)-side in the direction of the center axis 85 of the ink outlet 65.

The sixth embodiment described above has the following advantageous effects, in addition to the advantageous effects (1-2), (1-3), (3-3) and (3-4) described above:

(6-1) The positioning surfaces 84 configured to abut on part of the ink tank 41 (42-45)-side for the purpose of positioning are inclined (or curved) in the direction intersecting with the center axis 85 of the ink outlet 65. This configuration positions the ink refill container 63 in both the direction along the center axis 85 of the ink outlet 65 (direction of gravity) and the direction orthogonal to the center axis 85 (horizontal direction) in the process of ink refill from the ink refill container 63 to the ink tank 41 (42 to 45) and thereby ensures appropriate ink refill.

(6-2) The ink refill container 63 is gradually guided along the inclined (or curved) positioning surfaces 84 when the needle (ink inlet flow path portion) 56 is inserted into and pulled out from the ink outlet 65.

Seventh Embodiment

Figure 27:
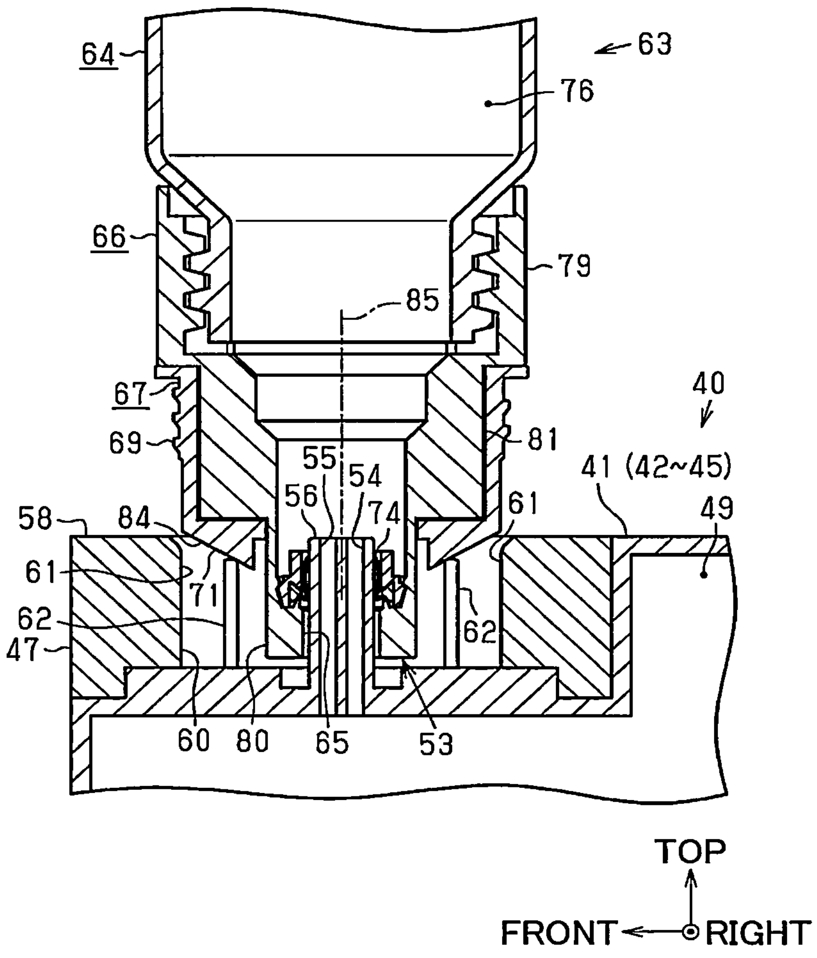
FIG. 27 is a partially broken side view illustrating an ink refill system according to a seventh embodiment.

As shown in FIG. 27, like the sixth embodiment, an ink refill container 63 according to a seventh embodiment is configured such that projections 71 protruded from a position on the outer side of an ink outlet 65 in a radial direction around the ink outlet 65 as the center toward the container leading end side in a direction along a center axis 85 of the ink outlet 65 serve as a positioning structure. More specifically, the projections 71 are provided in a region exposed outside of a container additional portion 67 that is part of an ink outlet forming portion 66. Slit-like clearances 86 are similarly formed between the projections 71 and a small diameter section 80.

Unlike the projections 71 of the sixth embodiment, however, the projections 71 of the seventh embodiment are formed such that inclined positioning surfaces 84 on their outer faces do not abut on the opening edge of the through hole 60 when the projections 71 are inserted into the recesses 61 of the tank-side through hole 60. More specifically, the projections 71 are formed such that the positioning surfaces 84 on their outer faces exert the wedge effect to abut on upper edges of first concavo-convex elements 62 that are provided as ribs extended in the vertical direction from the inner faces of the recesses 61 and that serve as an abutting portion. The positioning surfaces 84 may be curved in the direction intersecting with the center axis of the ink outlet 65.

As shown in FIG. 27, as in the sixth embodiment, in the process of ink refill from the ink refill container 63 of the seventh embodiment to the ink tank 41 (42 to 45), the small diameter section 80 is inserted into the ink inlet 53 in the tank-side through hole 60, and the projections 71 are subsequently inserted into the recesses 61 in the through hole 60. In this case, before the inclined positioning surfaces 84 of the projections 71 of the ink refill container 63 abut on the first concavo-convex elements (abutting portion) on the inner face of the through hole 60, the leading end of the needle 56 in the ink inlet 53 moves upward and reaches the position of a valve 74 in the ink outlet 65, so that the needle 56 opens the valve 74.

According to this seventh embodiment, in the course of insertion of the small diameter section 80 into the ink inlet 53 of the through hole 60, the small diameter section 80 may be gradually guided along the inclined positioning surfaces 84 on the outer faces of the projections 71 from the state that the positioning surfaces 84 are in contact with the opening edge of the through hole 60.

When the projections 71 of the ink refill container 63 are moved toward the bottom in the recesses 61 of the tank-side through hole 60 from the above state, the inclined positioning surfaces 84 on the outer faces of the projections 71 abut on the first concavo-convex elements (abutting portion) on the inner face of the through hole 60. In this case, the positioning surfaces 84 of the ink refill container 63 are positioned relative to the first concavo-convex elements (abutting portion) of the tank-side through hole 60 in a direction of gravity along the center axis 85 of the ink outlet 65 and in a horizontal direction orthogonal to the direction of gravity. The inclined positioning surfaces 84 on the outer faces of the projections 71 abut on the first concavo-convex elements (abutting portion) on the inner face of the through hole 60, so that the attitude of the ink refill container 63 is stabilized. This results in opening the valve 74 in the state of being positioned relative to the needle 56 on the ink tank 41 (42 to 45)-side in the direction of the center axis 85 of the ink outlet 65.

The seventh embodiment described above has similar advantageous effects to the advantageous effects (1-2), (1-3), (3-3), (3-4), (6-1) and (6-2) described above.

Eighth Embodiment

Figure 28:
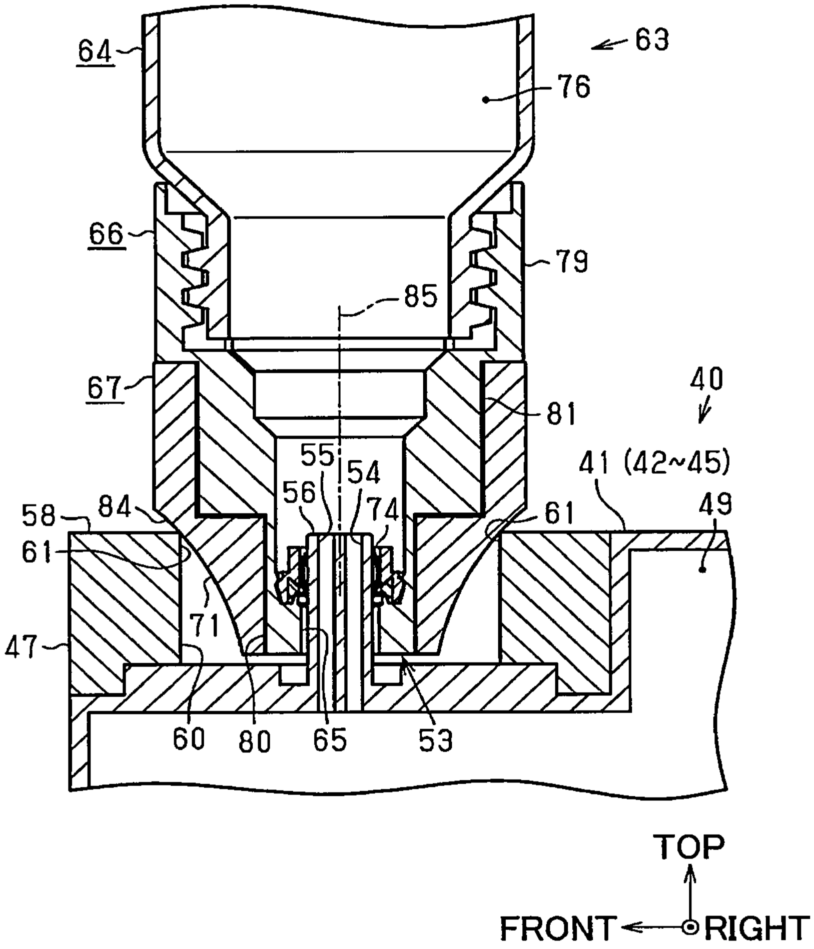
FIG. 28 is a partially broken side view illustrating an ink refill system according to an eighth embodiment.

As shown in FIG. 28, like the sixth embodiment, an ink refill container 63 according to an eighth embodiment is configured such that projections 71 protruded from a position on the outer side of an ink outlet 65 in a radial direction around the ink outlet 65 as the center toward the container leading end side in a direction along a center axis 85 of the ink outlet 65 serve as a positioning structure. More specifically, the projections 71 are provided in a region exposed outside of a container additional portion 67 that is part of an ink outlet forming portion 66. Positioning surfaces 84 are provided on outer faces (or outer circumferential faces) of the projections 71 that face the outside in the radial direction around the ink outlet 65 as the center.

Unlike the projections 71 of the sixth embodiment, however, in the projections 71 of the eighth embodiment, the positioning surfaces 84 provided on their outer faces are not inclined but are curved in a direction intersecting with the center axis 85 of the ink outlet 65. The positioning surfaces 84 are formed by conical surfaces or slant surfaces that are curved in a direction gradually farther away from the center axis 85 of the ink outlet 65 toward a container base end side, which is the opposite side to the container leading end side (i.e., the side where a container main body 64 is located), with respect to the direction along the center axis 85 of the ink outlet 65. The projections 71 are formed such that parts of plane regions of the curved positioning surfaces 84 exert the wedge effect to abut on the opening edge of the tank-side through hole 60 when the leading ends of the projections 71 are inserted into the tank-side through hole 60. According to a modified configuration, the positioning surfaces 84 may be inclined in the direction intersecting with the center axis 85 of the ink outlet 65.

As shown in FIG. 28, as in the sixth embodiment, in the process of ink refill from the ink refill container 63 of the eighth embodiment to the ink tank 41 (42 to 45), the needle 56 of the ink inlet 53 is first inserted into the ink outlet 65 the small diameter section 80 to open a valve 74. The curved positioning surfaces 84 on the outer faces of the projections 71 of the ink refill container 63 then abut on the opening edge of the tank-side through hole 60, and ink refill is performed in this state.

The eighth embodiment described above has similar advantageous effects to the advantageous effects (1-2), (1-3), (3-3), (3-4), (6-1) and (6-2) described above.

Ninth Embodiment

Figure 29:
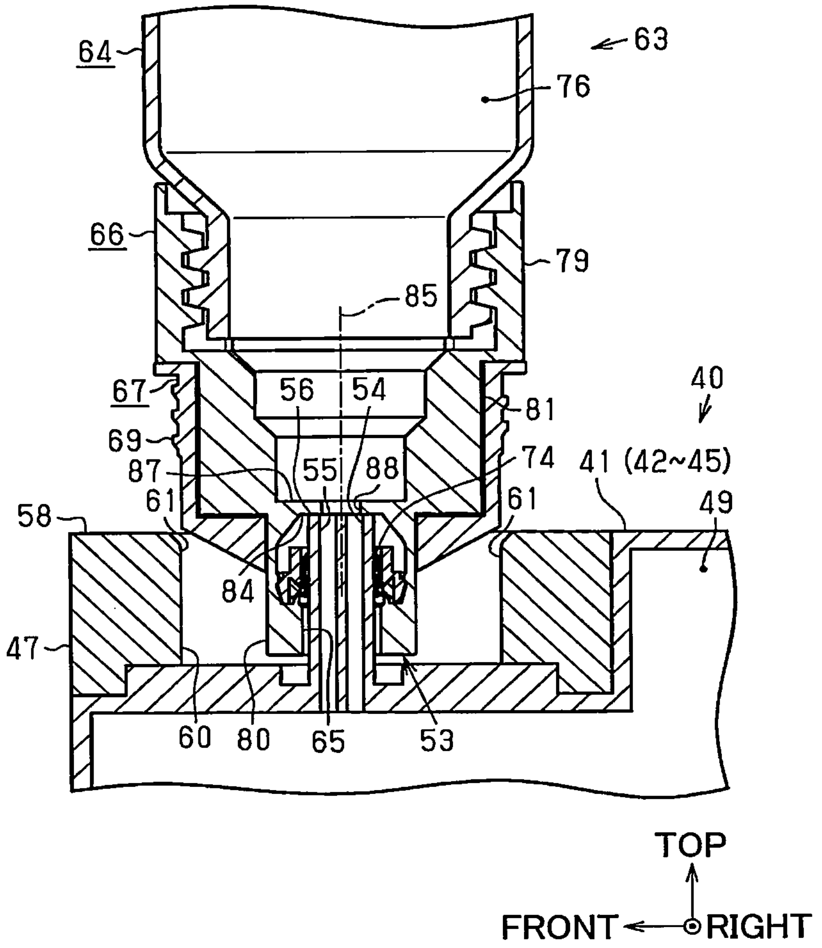
FIG. 29 is a partially broken side view illustrating an ink refill system according to a ninth embodiment.

As shown in FIG. 29, unlike the first to the eighth embodiments, in an ink refill container 63 according to a ninth embodiment, a positioning structure and a positioning surface are provided inside of an ink outlet 65 in a radial direction around the ink outlet 65 as the center. More specifically, in the ink refill container 63 of the ninth embodiment, an ink outlet forming portion 66 includes a partition wall 87 formed between a small diameter section 80 that is a tubular portion forming the ink outlet 65 on an inner circumferential side thereof and a middle section 81 that is arranged to be continuous with a base end side of the small diameter section 80. A positioning structure is configured by this partition wall 87. A connection hole 88 is formed in a center region of the partition wall 87 to be pierced at a position which a center axis 85 of the ink outlet 65 passes through, and is configured to connect the ink outlet 65 with an ink chamber 76.

A positioning surface 84 is configured by a wall surface of the partition wall 87 located on the container leading end side in a direction along the center axis 85 of the ink outlet 65. This positioning surface 84 is formed in a planar shape extended in a direction orthogonal to (intersecting with) the center axis 85 of the ink outlet 65, such as to abut on the leading end face of the needle (ink inlet flow path portion) 56 of the ink tank 41 (42 to 45) in surface contact.

As shown in FIG. 29, in the process of ink refill from the ink refill container 63 of the ninth embodiment to the ink tank 41 (42 to 45), the small diameter section 80 is inserted into the ink inlet 53 in the tank-side through hole 60. When the leading end of the needle 56 in the ink inlet 53 moves upward and reaches the position of a valve 74 in the ink outlet 65, the needle 56 opens the valve 74. When the ink refill container 63 is further moved toward the ink tank 41 (42 to 45) from this state, the positioning surface 84 in the planar shape formed on the partition wall 87 inside of the ink outlet 65 comes into contact with the leading end face of the needle (ink inlet flow path portion) 56. The positioning surface 84 provided in the ink outlet 65 and formed in the planar shape that is extended in the direction orthogonal to (intersecting with) the center axis 85 of the ink outlet 65 abuts on the leading end face of the needle (ink inlet flow path portion) 56, so that the attitude of the ink refill container 63 is stabilized. This results in opening the valve 74 in the state of being positioned relative to the needle 56 on the ink tank 41 (42 to 45)-side in the direction of the center axis 85 of the ink outlet 65.

The ninth embodiment described above has the following advantageous effects, in addition to the advantageous effects (1-2) and (1-3) described above:

(9-1) This configuration protects the positioning structure (in this case, the partition wall 87) and the positioning surface 84 inside of the ink outlet 65 and is unlikely to damage the positioning structure and the positioning surface 84, compared with a configuration that the positioning structure and the positioning surface 84 are provided outside of the ink outlet 65. The positioning structure (in this case, the partition wall 87) and the positioning surface 84 are placed near to the valve 74 inside of the ink outlet 65. This configuration enables the valve 74 to be positioned relative to the ink tank 41 (42 to 45) with high accuracy. Furthermore, even when ink adheres to the positioning structure (in this case, the partition wall 87) and the positioning surface 84 that are located inside of the ink outlet 65, this configuration reduces the possibility that ink adheres to outside of the ink refill container 63.

Tenth Embodiment

Figure 30:
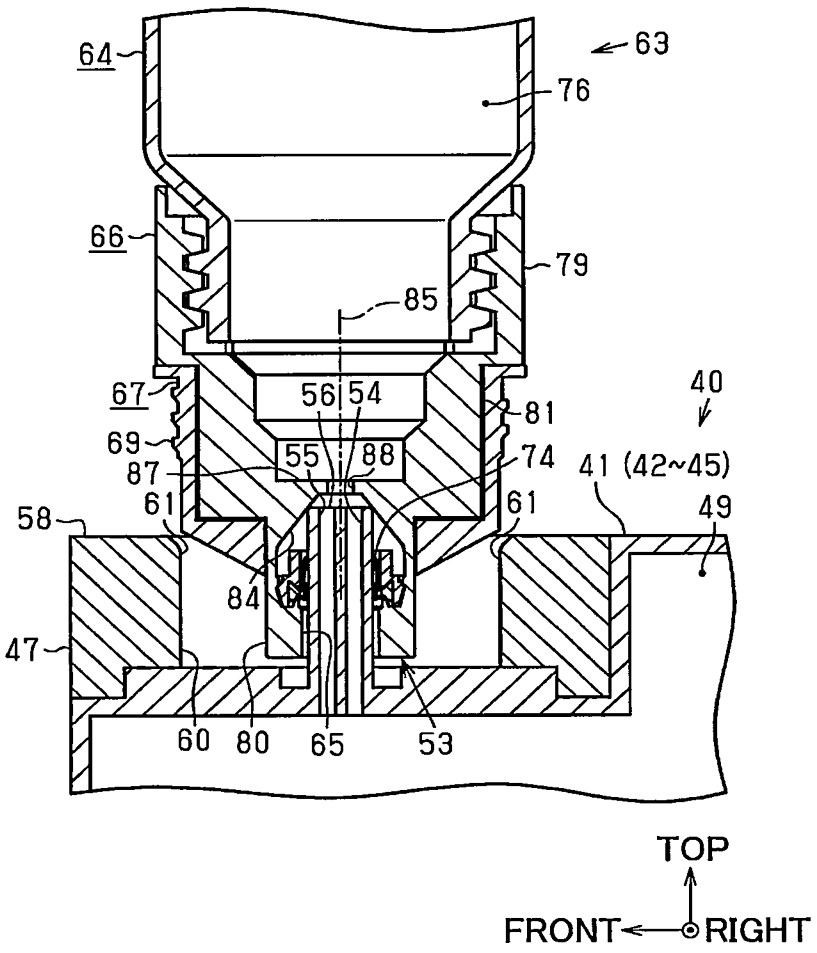
FIG. 30 is a partially broken side view illustrating an ink refill system according to a tenth embodiment.

As shown in FIG. 30, like the ninth embodiment, in an ink refill container 63 according to a tenth embodiment, a positioning structure and a positioning surface are provided inside of an ink outlet 65 in a radial direction around the ink outlet 65 as the center. More specifically, a positioning structure is configured by a partition wall 87 that is formed between a small diameter section 80 and a middle section 81 of an ink outlet forming portion 66, and a positioning surface 84 is configured by a wall surface of the partition wall 87 located on the container leading end side in a direction along a center axis 85 of the ink outlet 65. A connection hole 88 is formed to be pierced in a center region of the partition wall 87 and is configured to connect the ink outlet 65 with an ink chamber 76.

Unlike the positioning surface 84 of the ninth embodiment, however, the positioning surface 84 of the tenth embodiment is inclined in a direction intersecting with the center axis 85 of the ink outlet 65. More specifically, this positioning surface 84 is formed by a conical surface or a slant surface that is inclined in a direction gradually farther away from the center axis 85 of the ink outlet 65 toward the container leading end side, with respect to the direction along the center axis 85 of the ink outlet 65. The positioning surface 84 is formed such that part of a plane region of the inclined positioning surface 84 exerts the wedge effect to abut on the needle (ink inlet flow path portion) 56 when the leading end face of the needle (ink inlet flow path portion) 56 that opens the valve 74 comes upward into contact with the positioning surface 84.

The tenth embodiment described above has similar advantageous effects to the advantageous effects (1-2), (1-3) and (9-1) described above.

Eleventh Embodiment

Figure 31:
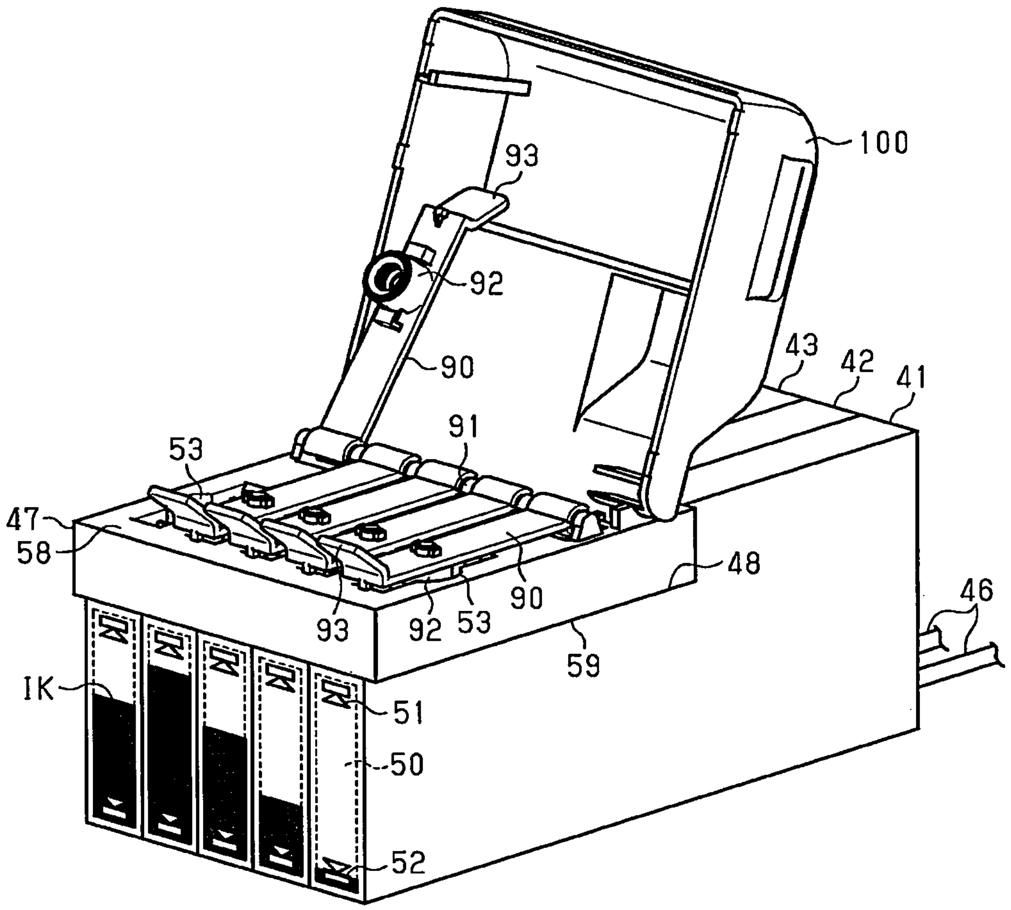
FIG. 31 is a perspective view illustrating an ink supply unit according an eleventh embodiment.
Figure 32:
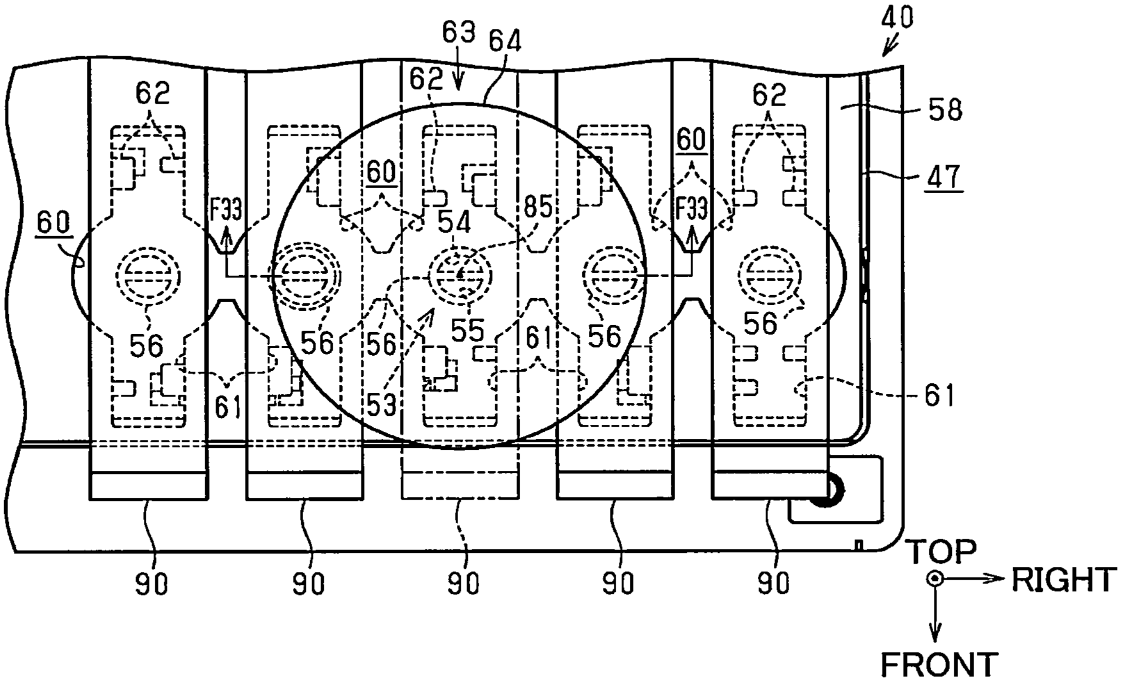
FIG. 32 is a partial plan view illustrating the ink supply unit in an ink refill process according to the eleventh embodiment.
Figure 33:
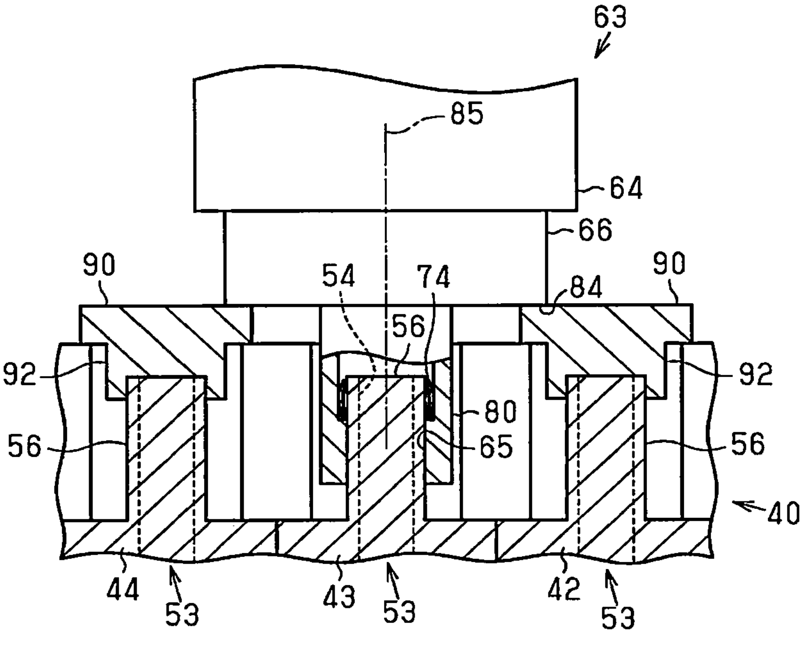
FIG. 33 is a sectional view taken along an arrow F33-F33 in FIG. 32.

As shown in FIGS. 31 to 33, an ink supply unit 40 forming, in combination with an ink refill container 63 according to an eleventh embodiment, an ink refill system is configured to include normally closed ink inlets 53. More specifically, this ink supply unit 40 includes lever-like cap support members 90 provided individually for the plurality of ink inlets 53. A base end of the cap support member 90 is supported in a rotatable manner by a rotating shaft 91 that is provided on the upper face 58 of the ink refill adapter 47 to be extended in a direction intersecting with a center axis of the ink outlet 53 (horizontal direction). An elastic cap 92 formed in a shape fittable in the ink inlet 53 is provided on a leading end side of the center in a longitudinal direction of each cap support member 90. The cap support member 90 is normally in a closed position where the elastic cap 92 is fit in the ink inlet 53.

As shown in FIG. 31 and FIG. 32, in the process of ink refill, the user grasps a folded handle 93 at a leading end of the cap support member 90 that is in the closed position where the elastic cap 92 is fit in the ink inlet 53 and tilts the cap support member 90 to separate the elastic cap 92 from the ink inlet 53 and to open the ink inlet 53. As shown in FIG. 31, a unit cover 100 may further be provided in a freely openable and closable manner to collectively cover the tops of the plurality of cap support members 90. The elastic cap 92 may be made of an elastic material, for example, an elastomer, and the cap support member 90 may be made of a material having a higher rigidity than that of the material of the elastic cap 92, for example, polystyrene or ABS resin.

As shown in FIG. 32 and FIG. 33, in the ink refill container 63 of the eleventh embodiment, a positioning structure is configured by a shoulder portion of an ink outlet forming portion 66 located on the container leading end side, and a positioning surface 84 is configured by a planar surface extended in a direction orthogonal to (intersecting with) a center axis 85 of an ink outlet 65. A small diameter section 80 that is a tubular portion forming the ink outlet 65 on an inner circumferential side thereof is protruded from a center region of this positioning surface 84 toward the container leading end side.

In the process of ink refill from the ink refill container 63 of the eleventh embodiment to the ink tank 41 (42 to 45), the user first lifts up the cap support member 90 to open the ink inlet 53, which is closed by the elastic cap 92, of the ink tank 41 (42 to 45) as an object of ink refill. The user subsequently inserts the needle (ink inlet flow path portion) 56 of the opened ink inlet 53 into the ink outlet 65 of the ink refill container 63. The leading end of the needle 56 in the ink inlet 53 moves upward and reaches the position of a valve 74 in the ink outlet 65, so that the needle 56 opens the valve 74. When the ink refill container 63 is further moved toward the ink tank 41 (42 to 45) from this state, the positioning surface 84 formed in the shoulder portion of the ink outlet forming portion 66 abuts on upper faces of the cap support members 90, so as to position the ink refill container 63 and the valve 74 in the ink outlet 65 relative to the ink tank 41 (42 to 45). The cap support member 90 is placed between the positioning surface 84 of the ink refill container 63 and part (for example, the through hole 60) of the ink tank 41 (42 to 45) and serves as an auxiliary positioning member to mediate abutting.

In this case, the positioning surface 84 comes into contact with the upper faces of the cap support members 90 that close the ink inlets 53 of other ink tanks (for example, int tanks 42 and 44) adjoining to an ink tank as an object of ink refill (for example, ink tank 43), by means of the elastic caps 92. The configuration that causes the positioning surface 84 to abut on the upper faces of both the adjacent cap support members 90 ensures the wide abutting area. In the case where the upper face 58 of the ink refill adapter 47 with the tank-side through hole 60 formed therein has, for example, an inclination or a step and is unsuitable for abutting on the positioning surface 84, the cap support member 90 having a certain planar region is used as the auxiliary positioning member.

The eleventh embodiment described above has the following advantageous effects, in addition to the advantageous effects (1-2) and (1-3) described above:

(11-1) In the process of ink refill from the ink refill container 63 to the ink tank 41 (42 to 45), the ink refill container 63 is appropriately positioned relative to the various ink tanks 41 (42 to 45) by means of the auxiliary positioning members (in this case, the cap support members 90).

Twelfth Embodiment

Figure 34:
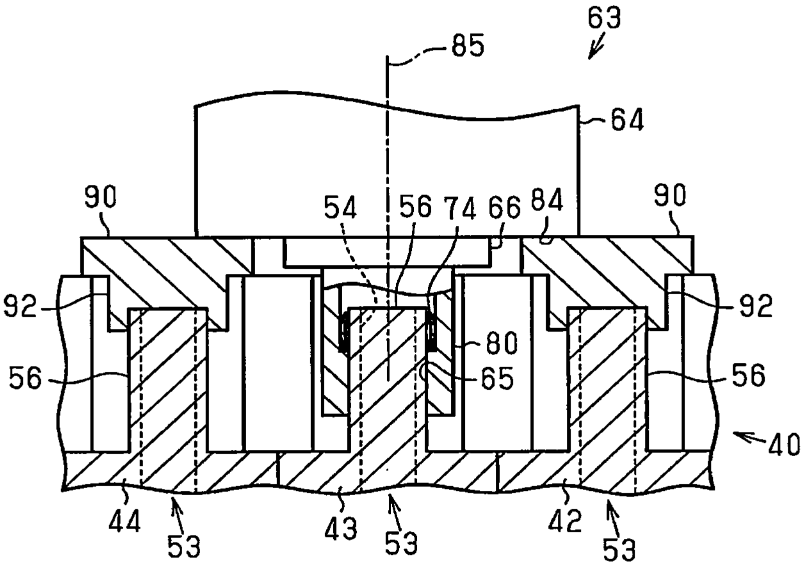
FIG. 34 is a partially broken front view illustrating an ink refill system according to a twelfth embodiment.

As shown in FIG. 34, like the eleventh embodiment, an ink refill container 63 according to a twelfth embodiment is configured such that a positioning surface 84 abuts on upper faces of cap support members 90 that close ink inlets 53 of other ink tanks adjoining to an ink tank 41 (42 to 45) as an object of ink refill, by means of elastic caps 92, in the ink refill process. When the needle (ink inlet flow path portion) 56 in the opened ink inlet 53 is inserted into an ink outlet 65 of the ink refill container 63, the needle 56 opens a valve 74. When the ink refill container 63 is further moved toward the ink tank 41 (42 to 45) from this state, the positioning surface 84 abuts on upper faces of the cap support members 90.

Unlike the eleventh embodiment, however, according to the twelfth embodiment, a positioning structure is configured not by the shoulder portion of the ink outlet forming portion 66 but by a shoulder portion of a container main body 64 that is on the container base end side of the ink outlet forming portion 66. A positioning surface 84 is configured by a planar surface provided in the shoulder portion of the container main body 64 and extended in a direction orthogonal to (intersecting with) a center axis 85 of the ink outlet 65. In the ink refill process, the weight of the container main body 64 including an ink chamber 76 is directly applied to the cap support members 90 serving as auxiliary positioning members, so that the ink refill container 63 is positioned in a stable attitude.

The twelfth embodiment described above has similar advantageous effects to the advantageous effects (1-2), (1-3) and (11-1) described above.

Thirteenth Embodiment

Figure 35:
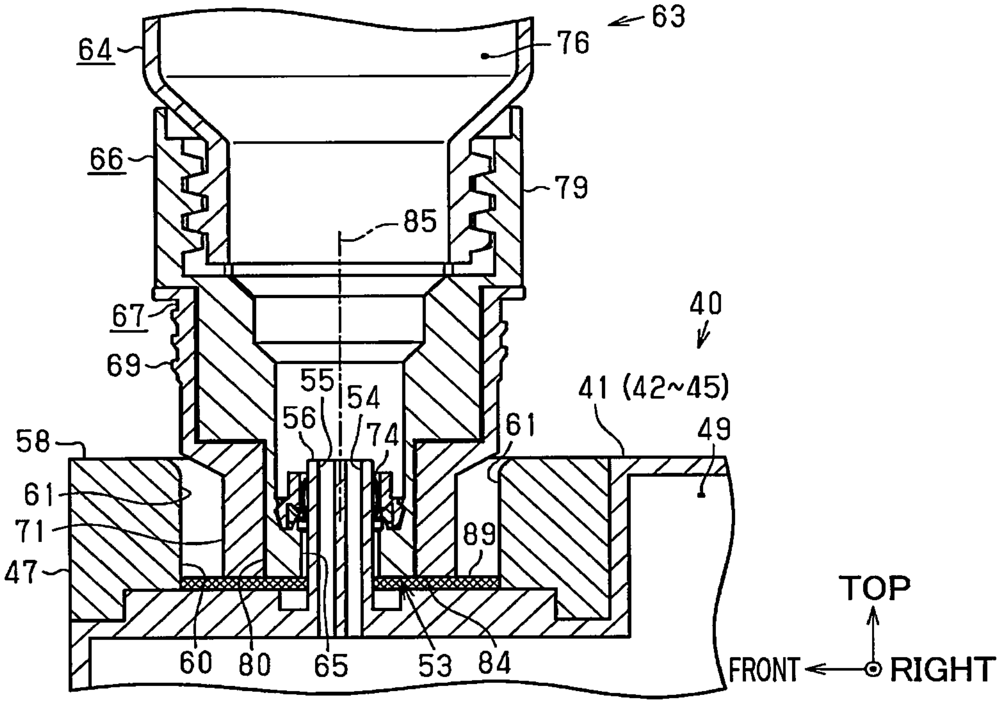
FIG. 35 is a partially broken side view illustrating an ink refill system according to a thirteenth embodiment.

As shown in FIG. 35, in an ink refill system according to a thirteenth embodiment, positioning surfaces 84 are configured by leading end faces of projections 71 protruded toward the container leading end side of an ink refill container 63. The ink refill container 63 is configured such that an ink absorber 89 is placed between the positioning surfaces 84, which are the leading end faces of the projections 71 inserted in the tank-side through hole and the bottom of the tank-side through hole 60 in the ink refill process. This ink absorber 89 is made of an elastic material, such as sponge, and serves as a buffer material between the projections 71 of the ink refill container 63 and the bottom of the tank-side through hole 60. The depth of insertion of the needle (ink inlet flow path portion) 56 into the ink outlet 65 is adjustable by regulating the thickness of the ink absorber 89.

The thirteenth embodiment described above has the following advantageous effects, in addition to the advantageous effects (1-2), (1-3) and (11-1) described above:

(13-1) The ink absorber 89 relieves the impact when the positioning surface 84 of the ink refill container 63 abuts on part of the ink tank 41 (42 to 45). Absorption of ink by the ink absorber 89 reduces dripping or spatter of ink when the ink refill container 63 is dismounted.

The above embodiments may be modified as described below:

- In the second embodiment shown in FIGS. 18 to 20, the container additional portion 67 may be omitted.
- The small diameter section 80 forming the ink outlet 65 on the inner circumferential side thereof may not be necessarily in the cylindrical shape but may be in a rectangular tubular shape according to the shape of the inner face of the ink inlet 53 in the tank-side through hole 60. It is, however, preferable that the ink outlet 65 on the inner circumferential side of the small diameter section 80 has an opening in a circular shape.
- In the third embodiment and the fourth embodiment shown in FIGS. 21 to 23, the height of protrusion of the projections 71 toward the container leading end side is not limited to the heights of the embodiments but may be any height that is protruded from the small diameter section 80.
- In the fourth embodiment, the shape of the leading end face of the projection 71 that forms the positioning surface 84 is not limited to the approximate T shape of the embodiment but may be another shape in which an area abutting on part of the ink tank 41 (42 to 45) on the side farther from the ink outlet 65 is larger than an abutting area on the side closer to the ink outlet 65 in the direction intersecting with the center axis 85 of the ink outlet 65, for example, an approximate Y shape or a triangular shape.

In the fifth embodiment shown in FIG. 24 and FIG. 25, the height of protrusion of the projections 71 toward the container leading end side is not limited to the height of the embodiment but may be any height that is not protruded from the small diameter section 80.

In the sixth embodiment shown in FIG. 26, the inclined positioning surface 84 may be extended to the leading end of the projection 71.

In the seventh embodiment shown in FIG. 27 (and the fifth embodiment shown in FIG. 25), the first concavo-convex elements 62 formed on the inner face of the recess 61 as the abutting portion that abuts on the positioning surface 84 may not be necessarily ribs but may be protrusions.

In the ninth and the tenth embodiments shown in FIGS. 29 and 30, the positioning surface 84 provided inside of the ink outlet 65 may be a recessed spherical surface with a connection hole 88 formed in the middle thereof.

In the third to the seventh embodiments, the width of the slit-like clearance 86 is not limited to the widths of the embodiments but may be any width that causes the capillary phenomenon.

The two flow paths 54 and 55 of the needle (ink inlet flow path portion) 56 in the ink inlet 53 may be replaced by a configuration of a plurality of flow paths other than two.

In the ink refill container 63, the ink outlet forming portion 66 may be integrated with the container main body 64, and the positioning structure and the positioning surface 84 may be provided not in the container additional portion 67 but in the ink outlet forming portion 66 or in the container main body 64.

In the eleventh and the twelfth embodiments shown in FIGS. 31 to 34, the auxiliary positioning member that mediates abutting of part of the ink tank 41 (42 to 45)-side and the positioning structure may be configured by the container additional portion 67 that is added to the ink outlet forming portion 66.

In the thirteenth embodiment shown in FIG. 35, the auxiliary positioning member is not limited to the ink absorber 89 but may be, for example, a spacer made of a resin.

The valve 74 in the ink outlet 65 of the ink refill container 63 may be provided with one or more slits 75, which are not limited to the three slits but may be any other multiple number of slits, for example, two or four slits. the valve 74 is not limited to the slit valve provided with the slits 75 but may be a valve configured without the slits 75 to be pressed upward by the needle 56 and to be displaced in a valve-opening direction.

The third embodiment shown in FIG. 21 and FIG. 22 may be modified as described below.

Figure 36:
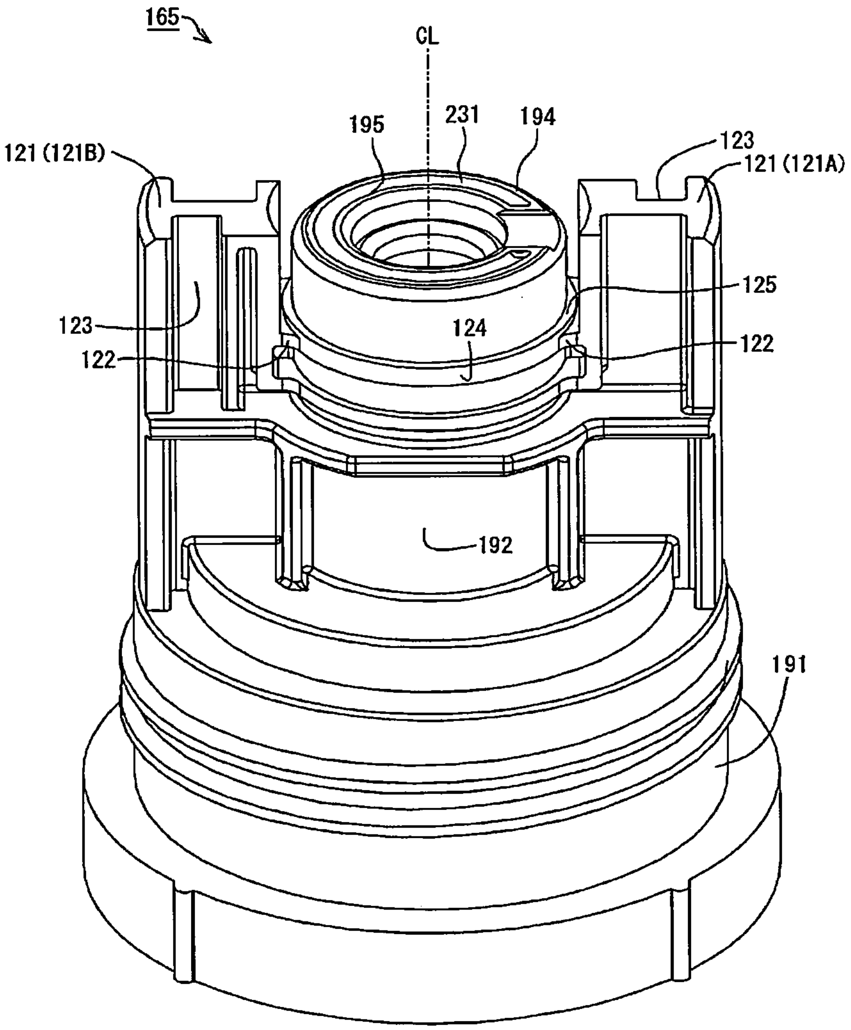
FIG. 36 is a perspective view illustrating an ink outlet forming portion according to a modification.
Figure 37:
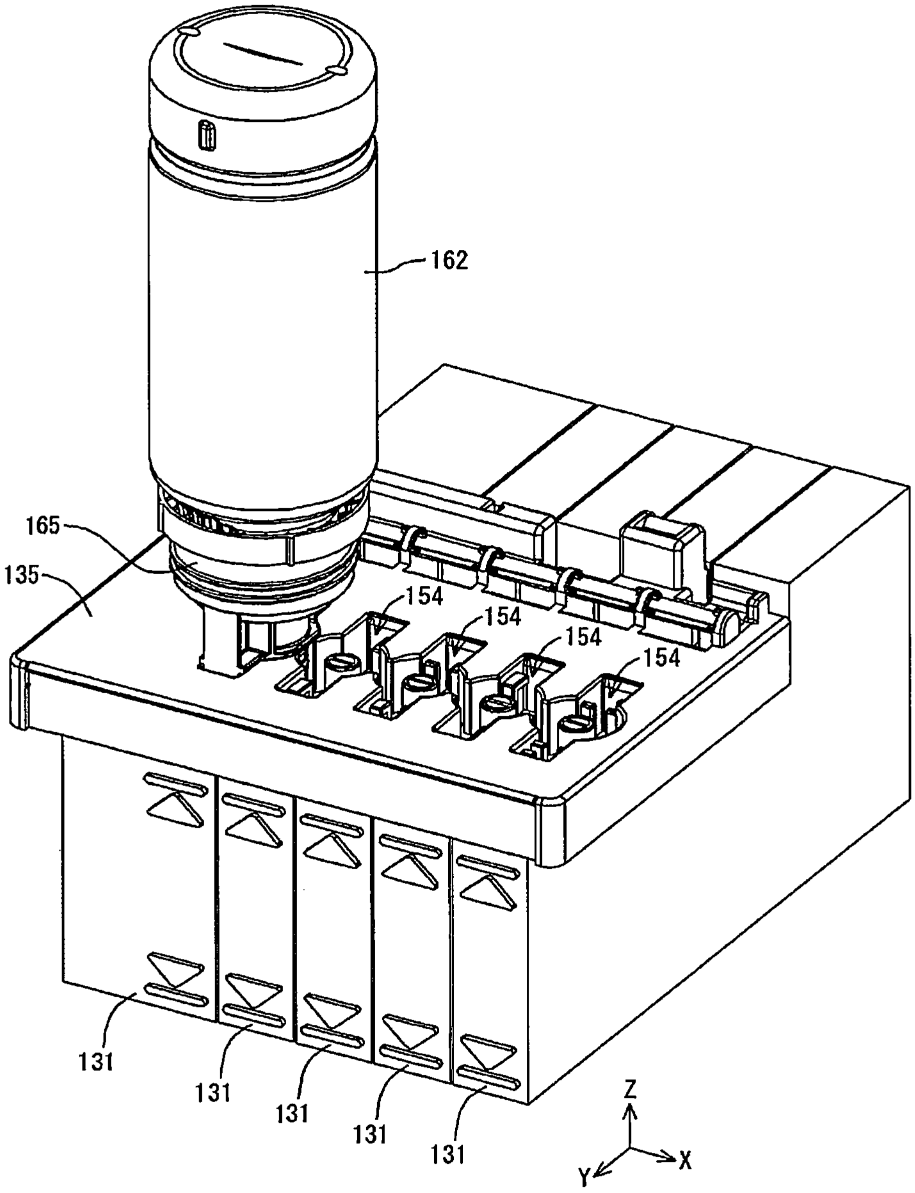
FIG. 37 is a perspective view illustrating an ink bottle and an ink supply device according to the modification.
Figure 38:
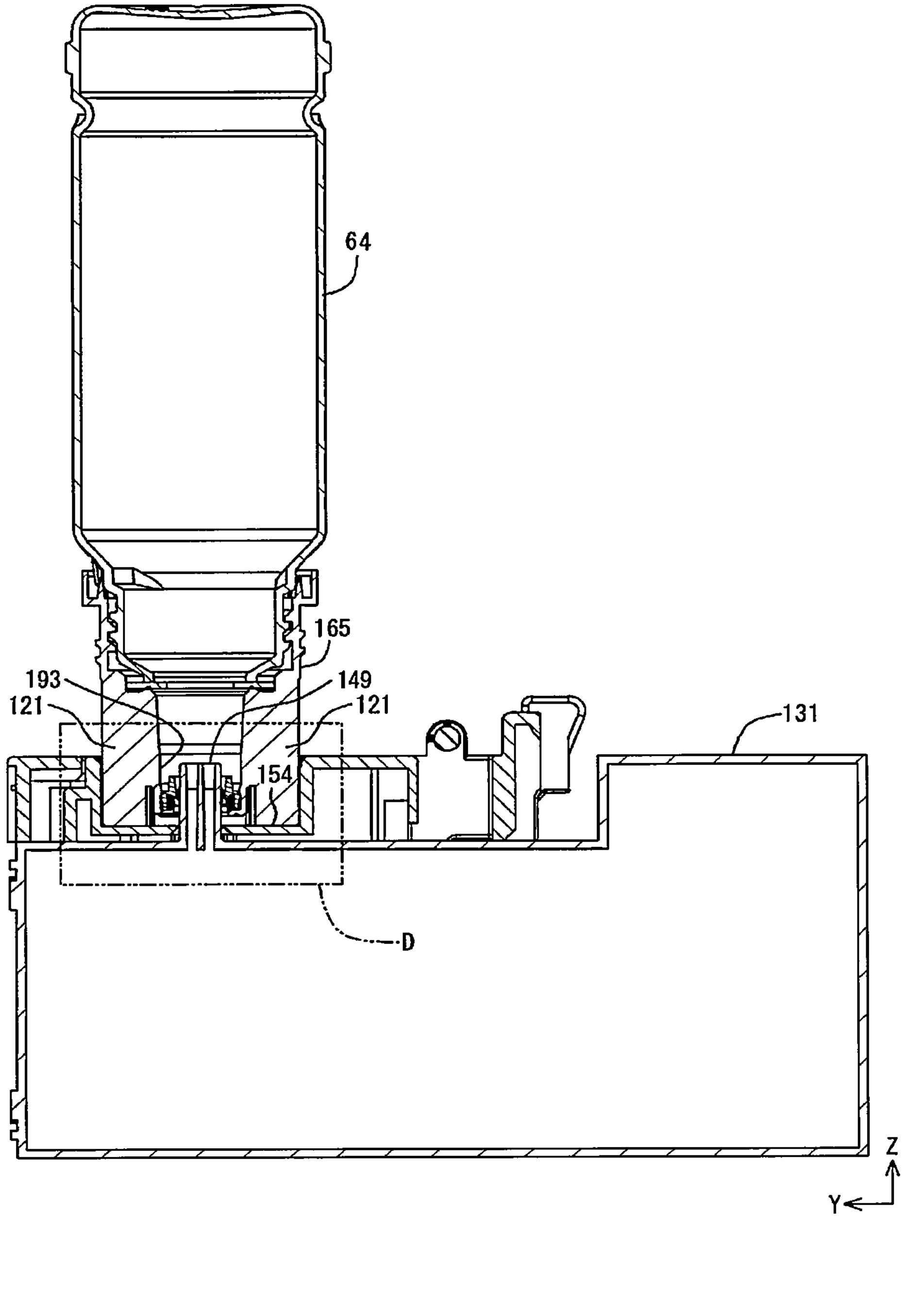
FIG. 38 is a sectional view illustrating the ink bottle and the ink supply device according to the modification.

An X axis, a Y axis and a Z axis that are three spatial axes orthogonal to one another are shown in FIGS. 37 and 38. The direction of an arrow X corresponds to, for example, rightward as shown in FIG. 2. The direction of an arrow Y corresponds to, for example, forward as shown in FIG. 2. The direction of an arrow Z corresponds to, for example, upward as shown in FIG. 2. As shown in FIG. 36, an ink outlet forming portion 165 is provided with a plurality of (in this modification, two) positioning structures 121. In the description below, when the two positioning structures 121 are to be discriminated from each other, the two positioning structures 121 are respectively expressed as positioning structure 121A and positioning structure 121B. In a plan view of the ink outlet forming portion 165 in a direction from a tubular portion 192 to a coupling portion 191, the positioning structure 121A and the positioning structure 121B are placed outside of the tubular portion 192.

In the ink outlet forming portion 165, the positioning structure 121A and the positioning structure 121B are provided on the coupling portion 191. In the plan view of the ink outlet forming portion 165 in the direction from the tubular portion 192 to the coupling portion 191, the positioning structure 121A and the positioning structure 121B are provided at positions facing each other across the tubular portion 192. The positioning structure 121A and the positioning structure 121B are protruded from the coupling portion 191 toward an end face 194. The positioning structure 121A and the positioning structure 121B are respectively coupled with the tubular portion 192 via connecting elements 122.

The positioning structure 121A and the positioning structure 121B are respectively provided with third recesses 123. The third recesses 123 are engaged with first concave-convex elements 62 formed in a through hole 154, which corresponds to the through hole 60 formed in the ink refill adapter 47 of the ink supply unit 40 (shown in FIG. 2). When the first concavo-convex elements 62 in the through hole 154 are fit in the third recesses 123 of the positioning structures 121, the ink outlet forming portion 165 is insertable into the through hole 154. The first concavo-convex elements 62 are arranged in one through hole 154 to be symmetric with respect to a center point of a connecting tube 149. Accordingly, in the plan view of the ink outlet forming portion 165 in the direction from the tubular portion 192 to the coupling portion 191, the positioning structure 121A and the positioning structure 121B are arranged to be symmetric with respect to a center axis CL of an ink outlet 195. The positioning structure 121A and the positioning structure 121B are formed at equal intervals of a phase angle of 180 degrees with respect to the center axis CL of the ink outlet 195. The center axis CL is an axis that vertically passes through the center of an area surrounded by the periphery of the ink outlet 195 in the plan view of the ink outlet forming portion 165 in the direction from the tubular portion 192 to the coupling portion 191.

A second projection 124 is formed on an outer wall of the tubular portion 192. The second projection 124 is provided continuously around the outer circumference of the tubular portion 192. This configuration forms a step between the outer circumference of the tubular portion 192 and the second projection 124. There is a wall 125 placed between the outer circumference of the tubular portion 192 and the second projection 124 to connect the step between an outer wall of the tubular portion 192 and the second projection 124. The wall 125 is arranged to face in a direction from the coupling portion 191 to the tubular portion 192. In the coupling portion 122 configured to couple the positioning structures 121 with the tubular portion 192, a region located nearest to an end face 194 is provided at a position farther from the ink outlet 195 than the wall 125 in an axial direction of the center axis CL.

A first recess 231 is formed in the end face 194 of the tubular portion 192 to be placed outside of the ink outlet 195. The first recess 231 is formed to be recessed toward the container main body 64 as shown in FIG. 36. Accordingly, ink dripping from the ink outlet 195 to the end face 194 is likely to be blocked by the first recess 231. This is likely to prevent ink dripping from the ink outlet 195 to the end face 194 from being spread toward the container main body 64. This ink refill container 162 accordingly has improved convenience.

As described above, the second projection 124 is formed on the outer wall of the tubular portion 192. The step is formed between the outer wall of the tubular portion 192 and the second projection 124, and ink is likely to be blocked by the wall 125 connecting the step. This is likely to prevent ink dripping from the ink outlet 195 to the tubular portion 192 from being spread toward the container main body 64. This ink refill container 162 accordingly has improved convenience.

As shown in FIG. 36, the region of the coupling portion 122 located nearest to the end face 194 is provided at the position farther from the ink outlet 195 than the wall 125 in the axial direction of the center axis CL. In other words, the step formed on the tubular portion 192 is provided at a position nearer to the ink outlet 195 than the coupling portion 122.

Accordingly, ink dripping from the ink outlet 195 to the tubular portion 192 is likely to be blocked by the wall 125 before the ink reaches the coupling portion 122. As a result, the ink dripping from the ink outlet 195 to the tubular portion 192 is unlikely to reach the coupling portion 122 and is thereby likely to prevent the ink from being spread toward the positioning structures 121.

Figure 39:
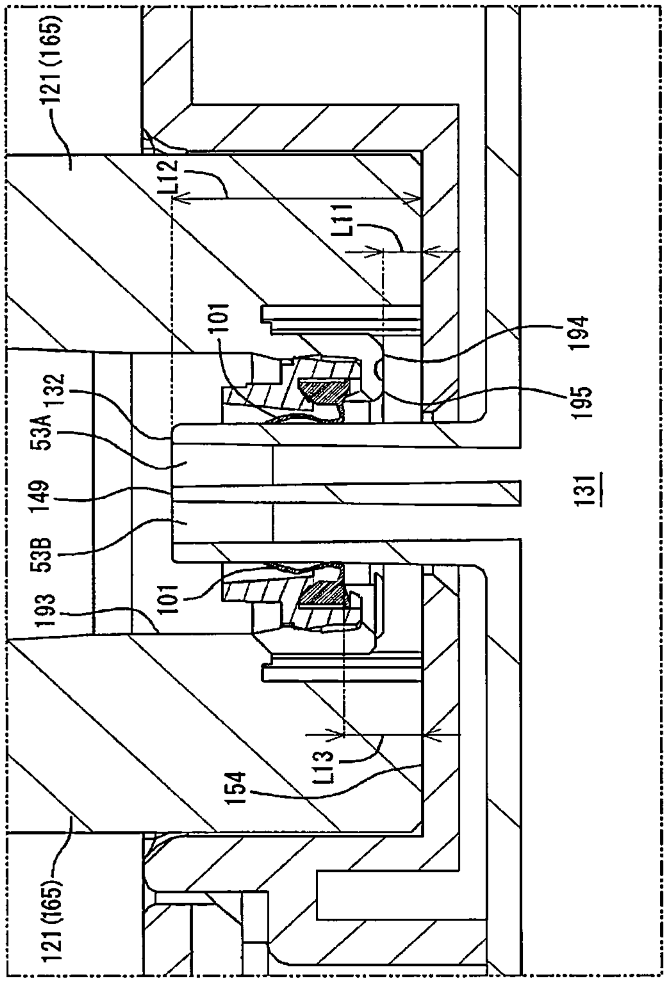
FIG. 39 is a close-up view of a region D shown in FIG. 38.

When the third recesses 123 of the positioning structures 121 are fit in the first concavo-convex elements 62 in the through hole 154, which corresponds to the through hole 60 formed in the ink refill adapter 47 of the ink supply unit 40 (shown in FIG. 2), the ink outlet forming portion 165 of the ink refill container 162 is insertable into the through hole 154 as shown in FIG. 37. In this state, as shown in the sectional view of FIG. 38, a connecting tube 149 of an ink tank 131 is inserted into a lead-out flow path 193 of the ink outlet forming portion 165. FIG. 38 illustrates a section when the ink tank 131 and the ink refill container 162 shown in FIG. 37 are cut along a YZ plane. At this moment, a valve 101 is opened by the connecting tube 149 as shown in FIG. 39 that is a close-up view of a section D shown in FIG. 38.

In the state that the positioning structures 121 of the ink outlet forming portion 165 hit against the bottom of the through hole 154, a distance LU from the bottom of the through hole 154 to the end face 194 and a distance L12 from the bottom of the through hole 154 to a leading end 132 of the connecting tube 149 have a relationship expressed by Expression (1) given below:

$$LU<L12 \qquad (1)$$

According to the relationship of Expression (1) given above, the leading end 132 of the connecting tube 149 enters from the ink outlet 195 into the lead-out flow path 193, in the state that the ink outlet forming portion 165 hits against the bottom of the through hole 154. Accordingly, the connecting tube 149 is connected with the ink outlet 195 in the state that the ink outlet forming portion 165 hits against the bottom of the through hole 154. In the ink tank 131, the connecting tube 149 is provided to be connectable with the ink outlet 195.

A distance L13 from the bottom of the through hole 154 to the valve 101 has a relationship expressed by Expression (2) given below, relative to the distance LU and the distance L12:

$$LU<L13<L12 \qquad (2)$$

According to the relationship of Expression (2) given above, the valve 101 is opened by the connecting tube 149 in the state that the positioning structures 121 of the ink outlet forming portion 165 hit against the bottom of the through hole 154. According to the above relationship, the positioning structures 121 define the position of the valve 101 relative to the ink tank 131 in the state that the ink outlet 195 is connected with the connecting tube 149 and the valve 101 is opened.

Accordingly, the lead-out flow path 193 communicates with inside of the ink tank 131 via a flow path 53A and a flow path 53B in the connecting tube 149. This configuration enables ink contained in the ink refill container 162 to be injected into the ink tank 131 via the connecting tube 149. As described above, inside of the connecting tube 149 is parted into the two flow paths 53A and 53B. This configuration causes the ink contained in the ink refill container 162 to flow through one of the flow paths 53A and 53B into the ink tank 131, while causing the atmosphere in the ink tank 131 to flow through the other of the flow paths 53A and 53B into the ink refill container 162. Accordingly, this configuration quickly accelerates exchange between ink in the ink refill container 162 and the atmosphere in the ink tank 131 (called gas liquid exchange) through the connecting tube 149 that is parted into the two flow paths 53A and 53B. As a result, this modification ensures quick injection of ink from the ink refill container 162 into the ink tank 131 and thereby improves the convenience.

REFERENCE SIGNS LIST

21 . . . recording device, 22 . . . housing, 23 . . . support base, 24 . . . guide shaft, 25 . . . record head, 26 . . . carriage, 27 . . . support hole, 28 . . . drive pulley, 29 . . . driven pulley, 30 . . . carriage motor, 31 . . . timing belt, 32 . . . eject slot, 33 . . . eject tray, 34 . . . paper feed cassette, 35 . . . open/close door, 36 . . . rotating shaft, 37 . . . window portion, 40 . . . ink supply unit, 41-45 . . . ink tanks, 46 . . . ink supply tube, 47 . . . ink refill adapter, 48 . . . step portion, 49 . . . ink chamber, visible portion, 51 . . . upper limit mark, 52 . . . lower limit mark, 53 . . . ink inlet, 54, 55 . . . flow paths, 56 . . . needle (ink inlet flow path portion), 57 . . . remaining amount sensor, 58 . . . upper face, 59 . . . lower face, 60 . . . through hole, 61 . . . recess, 62 . . . first concavo-convex element (abutting portion), 63 . . . ink refill container, 64 . . . container main body, 65 . . . ink outlet, 66 . . . ink outlet forming portion, 67 . . . container additional portion, 68 . . . cap, 69 . . . male threaded portion, 70 . . . protrusion, 71 . . . projection, 72 . . . second concavo-convex element, 73 . . . positioning structure, 74 . . . valve, 75 . . . slit, 76 . . . ink chamber, 77 . . . neck portion, 78 . . . male threaded portion, 79 . . . large diameter section, 80 . . . small diameter section (tubular portion), 81 . . . middle section, 82 . . . female threaded portion, 83 . . . joint structure, 84 . . . positioning surface, 85 . . . center axis, 86 . . . clearance, 87 . . . partition wall, 88 . . . connection hole, 89 . . . ink absorber (auxiliai'Y positioning member), 90 . . . cap support member (auxiliary positioning member), 91 . . . rotating shaft, 92 . . . elastic cap, 93 . . . handle, 100 . . . unit cover, P . . . paper, IK . . . ink, L1, L2 . . . distances

The invention claimed is:

1. An ink refill container for refilling ink to an ink tank through a needle of the ink tank, the ink refill container comprising:

a container main body configured to contain the ink; and an ink outlet portion connected to the container main body, the ink outlet portion including:

a cylindrical portion forming an ink outlet on an inner circumferential side of the cylindrical portion;

a positioning surface disposed within the cylindrical portion; and a valve disposed within the cylindrical portion, wherein the positioning surface is configured such that, in a state in which a needle has been inserted in the cylindrical portion to open the valve, the positioning surface contacts the needle.

2. The ink refill container according to claim 1, wherein the positioning surface has a surface extended in a direction intersecting with a center axis of the ink outlet.

3. The ink refill container according to claim 2, wherein the positioning surface is disposed toward the center axis in a radial direction of the cylindrical portion.

4. The ink refill container according to claim 1, wherein the positioning surface is formed in a planar shape extended in a direction orthogonal to a center axis of the ink outlet.

5. The ink refill container according to claim 1, wherein the valve has at least one slit in an elastic body.

* * * * *